US012472765B1

(12) United States Patent
Chapman et al.

(10) Patent No.: US 12,472,765 B1
(45) Date of Patent: Nov. 18, 2025

(54) METHODS OF PRINTING DOCUMENT MARKINGS WITH ENHANCED MOIRÉ EFFECTS, AND DOCUMENTS THAT EXHIBIT SUCH EFFECTS

(71) Applicant: Xerox Corporation, Norwalk, CT (US)

(72) Inventors: Edward N. Chapman, Rochester, NY (US); Jonathan Ireland, Lancaster, PA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 19/022,498

(22) Filed: Jan. 15, 2025

(51) Int. Cl.

| | |
|---|---|
| ***B41M 1/20*** | (2006.01) |
| ***B41M 1/18*** | (2006.01) |
| ***B41M 3/00*** | (2006.01) |
| ***B41M 3/14*** | (2006.01) |
| ***B42D 25/342*** | (2014.01) |

(52) U.S. Cl.
CPC ............. *B42D 25/342* (2014.10); *B41M 1/18* (2013.01); *B41M 1/20* (2013.01); *B41M 3/008* (2013.01); *B41M 3/14* (2013.01); *B41M 3/144* (2013.01)

(58) Field of Classification Search
CPC ......... B42D 25/342; B41M 3/14; B41M 1/18; B41M 1/20
USPC ........................................................... 283/902
See application file for complete search history.

(56) References Cited

U.S. PATENT DOCUMENTS

| | | | |
|---|---|---|---|
| 7,852,515 | B2 | 12/2010 | Eschbach et al. |
| 8,675,259 | B2 | 3/2014 | Chapman et al. |
| 9,083,896 | B2 | 7/2015 | Chapman |
| 9,282,215 | B2 | 3/2016 | Chapman et al. |
| 9,614,995 | B1 | 4/2017 | Chapman |
| 9,736,330 | B2 | 8/2017 | Eschbach et al. |
| 9,747,483 | B2 | 8/2017 | Lewis et al. |
| 9,961,230 | B2 | 5/2018 | Eschbach et al. |
| 10,051,156 | B2 | 8/2018 | Chapman et al. |
| 10,237,442 | B2 | 3/2019 | Chapman et al. |
| 10,425,554 | B1 | 9/2019 | Chapman |
| 10,452,964 | B1 | 10/2019 | Chapman et al. |
| 10,462,326 | B2 | 10/2019 | Chapman |

(Continued)

FOREIGN PATENT DOCUMENTS

| | | | |
|---|---|---|---|
| EP | 0281350 A1 * | 9/1988 | |
| WO | 2022197578 A1 | 9/2022 | |

OTHER PUBLICATIONS

Lombrozo, T., The Rotating Snakes Are All in Your Mind, Mar. 24, 2014, NPR, 13.7 Cosmos & Culture.

(Continued)

*Primary Examiner* — Kyle R Grabowski
(74) *Attorney, Agent, or Firm* — Fox Rothschild LLP

(57) ABSTRACT

A substrate includes a mark that exhibits an enhanced moiré effect. In some embodiments, the mark includes multiple sets of parallel lines printed at various angles and in certain color combinations that yield the mark that causes the substrate to exhibit the enhanced moiré effect when viewed. In some embodiments, various components of a mark are printed with inks having different fluorescent properties. In some embodiments, the mark is a pattern mark that includes a checkered pattern comprising cells of multiple colors, along with broken parallel lines along edges of some or all of the cells and frame elements within some or all of the cells.

26 Claims, 19 Drawing Sheets
(5 of 19 Drawing Sheet(s) Filed in Color)

(56) References Cited

U.S. PATENT DOCUMENTS

| | | | | |
|---|---|---|---|---|
| 10,812,675 | B1 | 10/2020 | Chapman | |
| 11,032,441 | B2 | 6/2021 | Chapman | |
| 11,390,102 | B1 | 7/2022 | Chapman | |
| 12,250,354 | B1 | 3/2025 | Chapman | |
| 2006/0129758 | A1 | 6/2006 | Trunck et al. | |
| 2016/0096393 | A1 | 4/2016 | Chapman et al. | |
| 2018/0304668 | A1 * | 10/2018 | Dietemann .......... | B42D 25/305 |
| 2021/0170775 | A1 | 6/2021 | Chapman | |
| 2021/0327081 | A1 * | 10/2021 | Takizawa ............. | B42D 25/351 |
| 2024/0131860 | A1 | 4/2024 | Chapman | |

OTHER PUBLICATIONS

Kitaoka, A., Color-dependent motion illusins in stationary images: What causes illusory motion?, International Symposium on Optical Illusion 2015, Japan.
Speciality Imaging: Fraud-Resistant Effects that Protect Your Most Sensitive Documents, Xerox brochure, 2019.

* cited by examiner

METHODS OF PRINTING DOCUMENT MARKINGS WITH ENHANCED MOIRÉ EFFECTS, AND DOCUMENTS THAT EXHIBIT SUCH EFFECTS

BACKGROUND

Counterfeit documents are a significant problem in many contexts. When sensitive documents such as identification documents, chain of title documents, event tickets, prescriptions, receipts, vouchers, and coupons are copied, fabricated, or fraudulently altered, the improper documents can result in costs, security breaches, and other adverse consequences for the entities that receive the documents. To address this problem, various document printing techniques have been developed in the field of security printing to print documents with marks that help protect the documents from copying, forging, and counterfeiting.

For example, a correlation mark is an example of a security mark that is typically robust. A correlation mark includes one or more elements that are invisible or hardly visible on a printed document. The hidden elements become visible when the document is viewed through a correlation mask—i.e., a decoding screen that serves as a "key" to the correlation mark. The pattern in the mask may be a stochastic screen that corresponds to pixel elements of mark. Aligning the correlation mask to the printed document or image causes a correlation image to become visible. An example of a correlation mark is taught in U.S. Pat. No. 5,734,752 titled "Digital watermarking using stochastic screen patterns," the disclosure of which is incorporated into this document by reference in its entirety.

Other examples of security marks include: (i) MicroText marks, which are characters or other graphics printed at smaller than one-point size, readable only with a loupe or other magnifying glass; (ii) GlossMark® (a registered trademark of Xerox Corporation) characters, which are characters printed in a manner such that that they not visible in a straight-on view, but that become visible under inclined illumination; (iii) fluorescent marks, which are printed characters that are only visible under black light or other ultraviolet light; and (iv) infrared marks, which are printed characters that are only visible with an infrared camera.

Security marks often require special printing materials, which can increase their costs. In addition, marks that are visible only in the presence of infrared light, in the presence of ultraviolet light, or with the use of a decoding "key" device are not always desirable because they require specific devices to decode them, and the recipient of the document may not have such devices.

This disclosure describes methods and systems for generating new security marks, as well as new security marks themselves, that address some or all of the issues described above.

SUMMARY

In some embodiments, a method of printing a mark on a substrate includes, by a processor, generating a pattern mark to be printed within a boundary on a substrate by: (a) generating a first set L1 of parallel lines to be printed at a first frequency F1 and first angle A using a first color C1; (b) generating a second set L2 of parallel lines to be printed at the first frequency F1 and first angle A using a second color C2, wherein the lines of the second set L2 have a width that is a minimum width that can be printed by the print engine; (c) generating a third set L3 of parallel lines to be printed at a second frequency F2 and a second angle B using a third color C3, wherein the second angle B is plus or minus approximately 90 degrees or approximately 270 degrees from the first angle A; and (d) generating a fourth set L4 of parallel lines to be printed at the second frequency F2 and the second angle B using a fourth color C4, wherein the lines of the fourth set L4 have a width that is the minimum width that can be printed by the print engine. The method also includes, by the print engine, printing the pattern mark in the boundary on the substrate. Embodiments also include substrates including pattern marks printed by the above process, as well as systems that include such substrates.

In some embodiments, a method of printing a mark on a substrate includes, by a processor: (a) rendering a first pattern ink comprising a first pattern that, when printed on a substrate in a print area, will exhibit a first set of fluorescent properties; (b) rendering a second pattern ink comprising a second pattern that, when printed on a substrate in the print area, will exhibit a second set of fluorescent properties; and (c) creating a mark that includes a background portion made of the first pattern ink and a foreground portion made of the second pattern ink.

The method also comprises, by a print engine of a print device, printing the mark within the print area on the substrate. The foreground portion represents a message that is hidden when viewed under ambient light but visible when viewed under ultraviolet light. Embodiments also include substrates including pattern marks printed by the above process, as well as systems that include such substrates.

BRIEF DESCRIPTION OF THE DRAWINGS

The patent or application file contains at least one drawing executed in color.

Copies of this patent or patent application publication with color drawing(s) will be provided by the Office upon request and payment of the necessary fee.

FIG. 3A illustrates a first example of a pattern mark that can be generated via the process of FIG. 1, while

FIG. 8A illustrates a close-up example of a pattern ink segment that may serve as a building block of the pattern of FIG. 7, while

FIG. 13A illustrates how the document may appear when viewed in visible light, while FIG. 13B illustrates how the document may appear when viewed in ultraviolet light.

DETAILED DESCRIPTION

Figure 1:
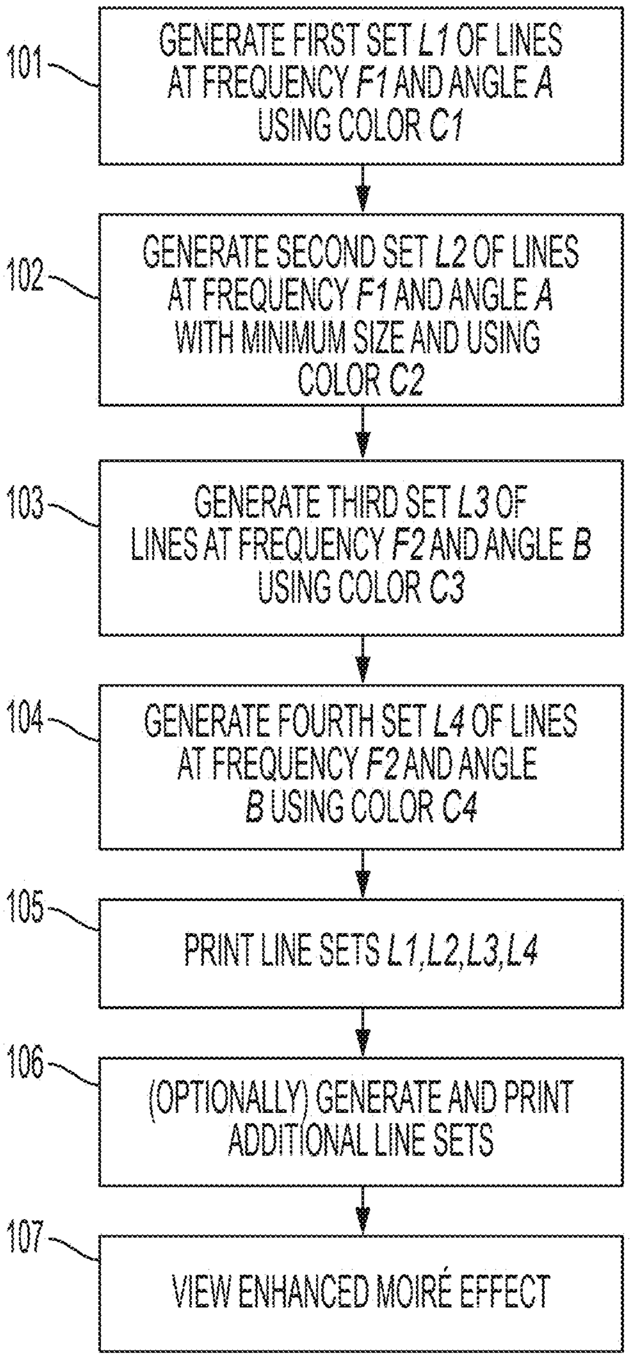
FIG. 1 is a flow diagram that illustrates a method of generating a multicolored pattern mark that will exhibit an enhanced moiré effect when viewed.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such as "first" and "second" are used to modify a noun, such use is simply intended to distinguish one item from another, and is not intended to require a sequential order unless specifically stated.

The term "approximately" when used in connection with a numeric value, is intended to include values that are close to, but not exactly, the number. For example, in some embodiments, the term "approximately" may include values that are within +/−10 percent (or, in some embodiments, +/−5 percent, +/−3 precent, or +/1 percent) of the value. By way of example, the phrase "approximately 100%" will include values from 90% to 100%, and the phrase "approximately 90 degrees" will include values from 81 degrees to 99 degrees.

Similarly, the term "substantially perpendicular" refers to lines or other structures that form an angle that is within +/−10 percent (or +/−5 percent, +/−3 precent, or +/1 percent) of 90 degrees or 270 degrees. The term or "substantially parallel" means refers to lines or other structures that are equidistant from each other (within a tolerance of +/−10 percent, +/−5 percent, +/−3 precent, or +/1 percent) and that never touch each other on a substrate on which they are printed.

When used in this document, terms such as "top" and "bottom," or "upper" and "lower", are not intended to have absolute orientations but are instead intended to describe relative positions of various components with respect to each other. For example, a first component of a security mark may be an "upper" component and a second component of a security mark may be a "lower" component when the mark is oriented in a first direction. The relative orientations of the components may be reversed, or the components may be on the same plane, if the orientation of the mark is changed. The claims are intended to include all orientations of a mark containing such components.

Additional terms that are relevant to this disclosure will be defined at the end of this Detailed Description section.

This document describes several methods of printing secure markings on documents that do not require custom inks with unique properties. In addition, some of the secure markings described in this document may not require any equipment other than a camera to be viewed and/or decoded. Other methods described in this document require specific equipment for viewing, but also add additional security effects to the markings.

FIG. 1 describes a first example of a method of printing a mark on a document. The mark will comprise a pattern ink in which lines of the pattern are printed at either a first frequency F1 or a second frequency F2. The term frequency refers to the inverse of the period, which is the distance or number of pixels that include a full cycle of the pattern. For example, if F1 is greater than F2, then lines printed at the first frequency F1 will appear more frequently (as they will be spaced closer together) than lines printed at the second frequency F2. In this process, F1 and F2 may be the same frequency in some embodiments, or they may be frequencies that are different from each other. An example of various elements of such a mark are illustrated in FIG. 2.

Figure 2:
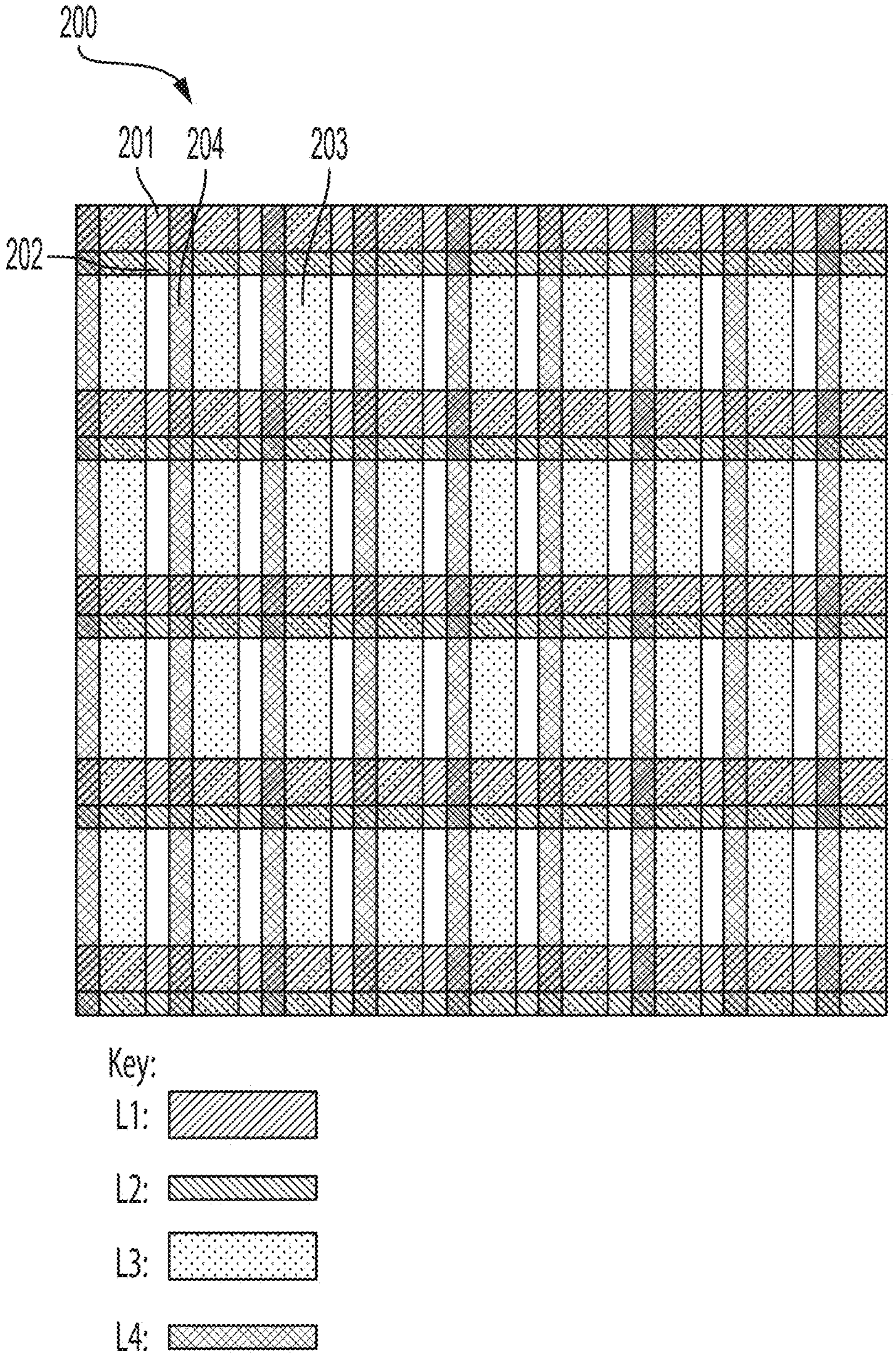
FIG. 2 illustrates example elements of a pattern mark generated via the process of FIG. 1.

In the method of FIG. 1, and with reference to the magnified example pattern mark 200 of FIG. 2 (in which different cross-hatching and dot patterns are used to show different line color and width combinations), a processor of a print device will execute programming instructions embodied in a print file that cause a print engine of the print device to print a pattern ink within a boundary on a substrate. Although FIG. 2 shows a boundary as a thin black line around the pattern mark 200, the boundary line does not necessarily need to be printed, in which case the boundary will simply be the edges of the area within which the mark is printed.

The process will include, at step 101, a processor generating a first set of parallel lines L1 at a first frequency F1 using a first color C1. The first set of lines L1 will all be printed a common angle A with respect to an edge of the substrate. For example, angle A may be an angle that is approximately 90 degrees with respect to the top or bottom edge of the substrate, such as is illustrated by lines 201 of set L1 in FIG. 2. The width of each line (i.e., the line's thickness at the thinnest dimension of the line) in first set L1 may be one pixel, multiple pixels, or any other number of pixels.

At step 102, the processor will generate a second set of lines L2 using a second color C2 at the frequency F1 and angle A. The width of each line in second set (illustrated by line 202 of set L2 in FIG. 2) will be the approximately minimum width that the print device is capable of printing, which is typically one pixel. The widths of the lines in the first set L1 and that of the lines in the second set L2 may be the same, or they may be different from each other. As shown in FIG. 2, in some embodiments each line 201 in set L1 may be printed adjacent to, or slightly overlapping with, a corresponding line 202 of set L2 so that each line 201 in set L1 has one side that contacts a corresponding line 202 in set L2 and each line 202 in L2 has one side that contacts a corresponding line 201 in set L1.

At step 103, the processor will generate a third set of lines L3 at a second frequency F2 using a third color C3. Second frequency F2 may be the same as first frequency F1, or second frequency F2 and first frequency F1 may be different frequencies. The lines in the third set L3 (illustrated in FIG. 3 by example line 203) will be printed at a second angle B that is plus or minus approximately 90 degrees or approximately 270 degrees from the value of angle A. This means that the lines in third set L3 will be perpendicular or approximately perpendicular to the lines of the first set L1 and second set L2.

In some embodiments, at step 104, the processor may generate a fourth set of lines L4 using a fourth color C4 at the frequency F2 and angle B. The width of each line in the fourth set (illustrated by lines L4 242 in FIG. 2) will be approximately the minimum width that the print device is capable of printing, which is typically one pixel. The widths of lines in the third set L3 and that of the lines in the fourth set L4 may be the same, or they may be different from each other.

As shown in FIG. 2, in some embodiments each line L3 203 may be printed adjacent to, or partially overlapping with, a corresponding line L4 204 so that each line 203 in set L3 has one side that contacts a corresponding line 204 in set L4 and each line 204 in L4 has one side that contacts a corresponding line 203 in set L3.

Any or all of the colors C1, C2, C3, and C4 may be the same as each other, or they may be different from each other. For example, in some embodiments, one of the colors of the angle A lines (such color C1) may be the same as one of the colors of the angle B lines (such as color C3). In some embodiments, two of the line sets may be printed with the same color, while the other two line sets may be printed with different color. For example, in a CMYK color model, the line sets may appear as colors MBBC, KBBC, KBBK, or YBBC (where "B" represents blue and is a combination of cyan C and magenta M, and the two middle colors represent areas of overlap.), KCCY, KYYC, or any other combination of colors.

In some embodiments, at step 106 additional line sets may be added to the mark. For example, the print device may print a fifth set L5 of lines using a fifth color C5 at the frequency F1 and angle A, so that each line in the fifth set is positioned adjacent to or partially overlapping with a corresponding line of first set L1, but on the other side of the first set L1 line. In this way, each line of first set L1 may have a line of the second set L2 positioned on one side of it and a line of the fifth set L5 positioned on the other side of it. The print device may then print a sixth set L6 of lines using a sixth color C6 at the frequency F2 and angle B, so that each line in the sixth set L6 is positioned adjacent to or partially overlapping with a corresponding line of third set L3, but on the other side of the third set L3 line. In this way, each line of third set L3 may have a line of the fourth set L4 positioned on one side of it and a line of the sixth set L6 positioned on the other side of it. Additional line sets may be added according to a similar process, with all lines being adjacent to at least one other line of a different set.

Generating the lines at steps 101-104 may be done by a processor that is generating a print file, by a processor that is processing data from a print file to render it into a format that the print engine can implement, or both. When generating is complete, at 105 the print engine of the printer may print the lines of sets L1, L2, L3, and L4 on a substrate according to the parameters provided by the processor.

Figure 3A:
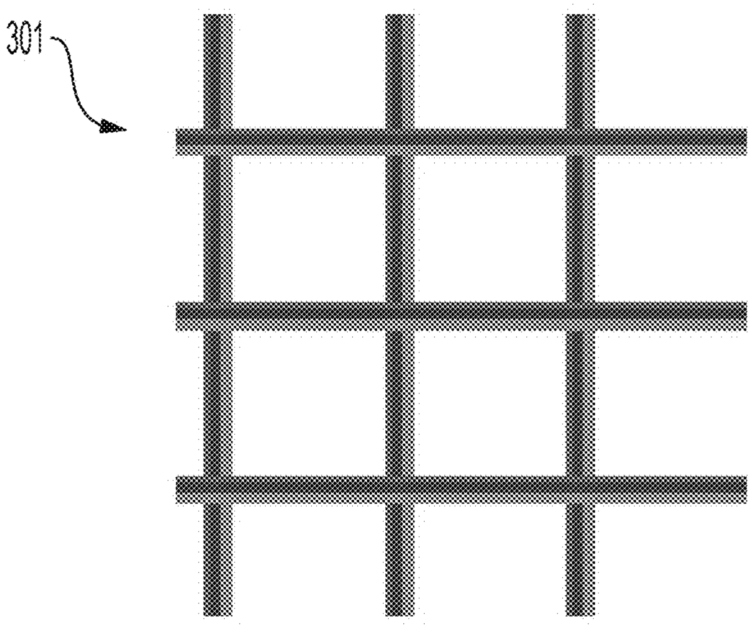

The various lines sets may be printed in a grid pattern 301 such as is shown in FIG. 3A. In FIG. 3A, the pattern mark includes two vertical line sets (i.e., lines positioned at 90 degrees with respect to the page's top and bottom), one of which is magenta and one of which is cyan. Each vertical line partially overlaps with one other vertical line, thus providing an overlapping area that appears to be purple. The pattern mark also includes two horizontal line sets (i.e., positioned at an angle that is approximately 90 degrees or 270 degrees away from the angle of the lines in the first three sets), one of which is magenta and one of which is cyan. Each vertical line partially overlaps with one other vertical line, thus providing an overlapping area that appears to be purple. Each group of vertical (angle A) lines intersects with a corresponding group of horizontal (angle B) lines so that no gaps are provided in the grid pattern.

Figure 3B:
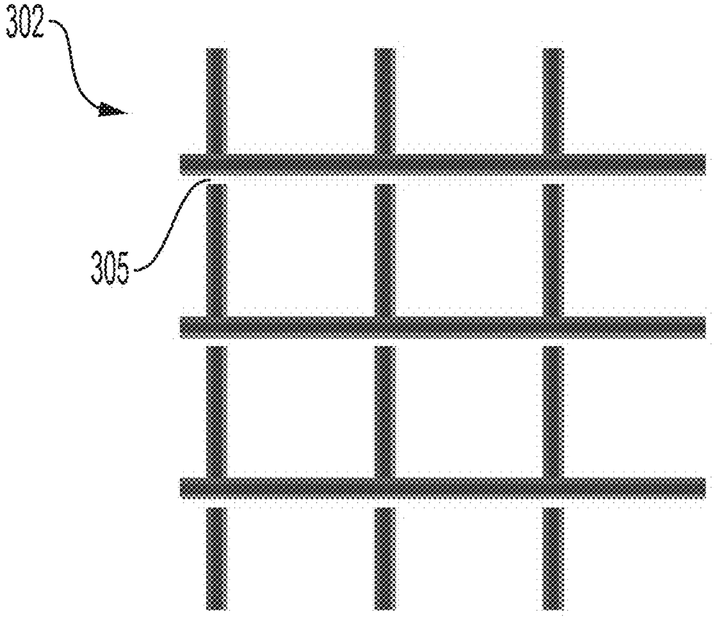
FIG. 3B illustrates a variation of the pattern mark of FIG. 3A.

FIG. 3B illustrates an alternative grid pattern 302 in which all lines that are oriented at one of the angles (A or B) are printed as broken lines to provide a gap 305 between each angle A line group and a corresponding angle B line group so that lines do not interest in the gap and the grid pattern is a broken pattern. In various embodiments, some or all of the lines may be printed as broken lines as shown. Marks printed by the process of FIG. 1, such as the examples shown in FIGS. 2 and 3, have an enhanced moiré pattern when viewed at step 107. Thus, these pattern marks provide the function of causing the substrate to exhibit an enhanced moiré effect. In addition, unlike a typical moiré pattern that includes two pattern inks overlaid on top of each, the addition of one or more additional pattern inks, the selection of additional colors, and the optional use of a pattern ink having dissimilar pattern than the other pattern inks (as in FIG. 5) enhances the moiré pattern with a "buzzing" effect. The buzzing effect is one in which edges of some or all lines of the pattern will appear to be moving and/or intermittently flashing. The enhanced moiré effect will typically be most visible at the boundary of the pattern. Specifically, with this and other embodiments described in this document, the enhanced moiré effect may be visible at step 107 by the human eye without a camera or other device, and/or when viewed on a display of an electronic device after a camera of the electronic device has captured a video of the mark and displayed the video on the display of the electronic device.

Figure 4:
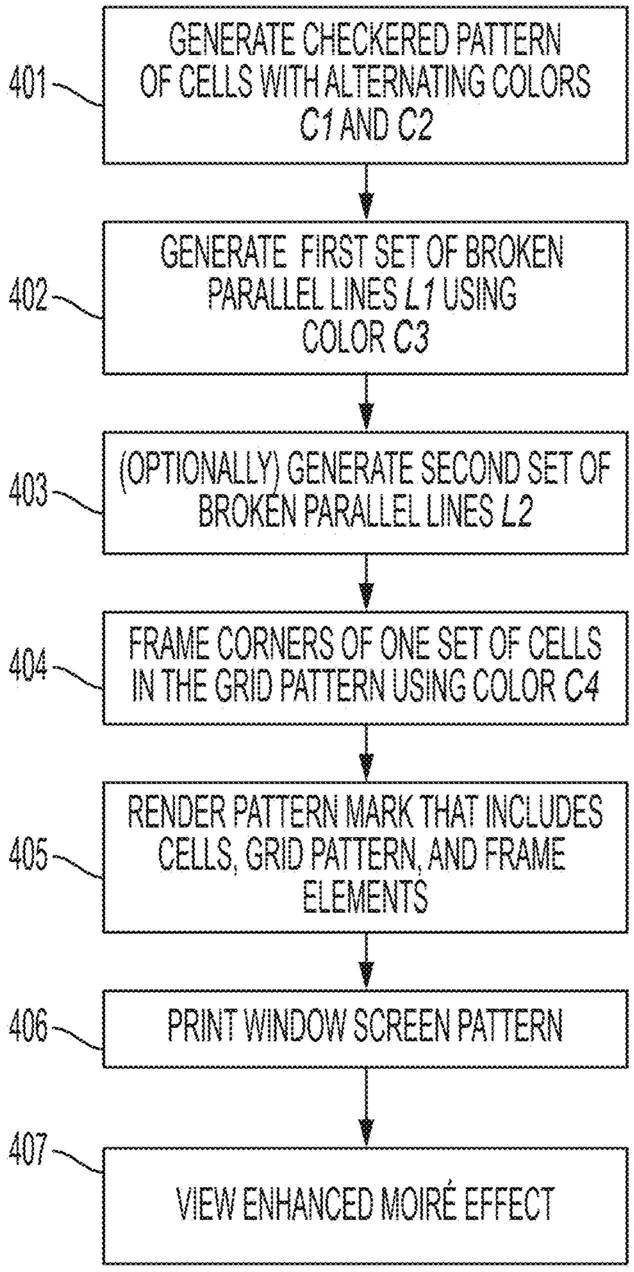
FIG. 4 is a flow diagram that illustrates an alternate method of generating a multicolored pattern mark that will exhibit an enhanced moiré effect when viewed.
Figure 5:
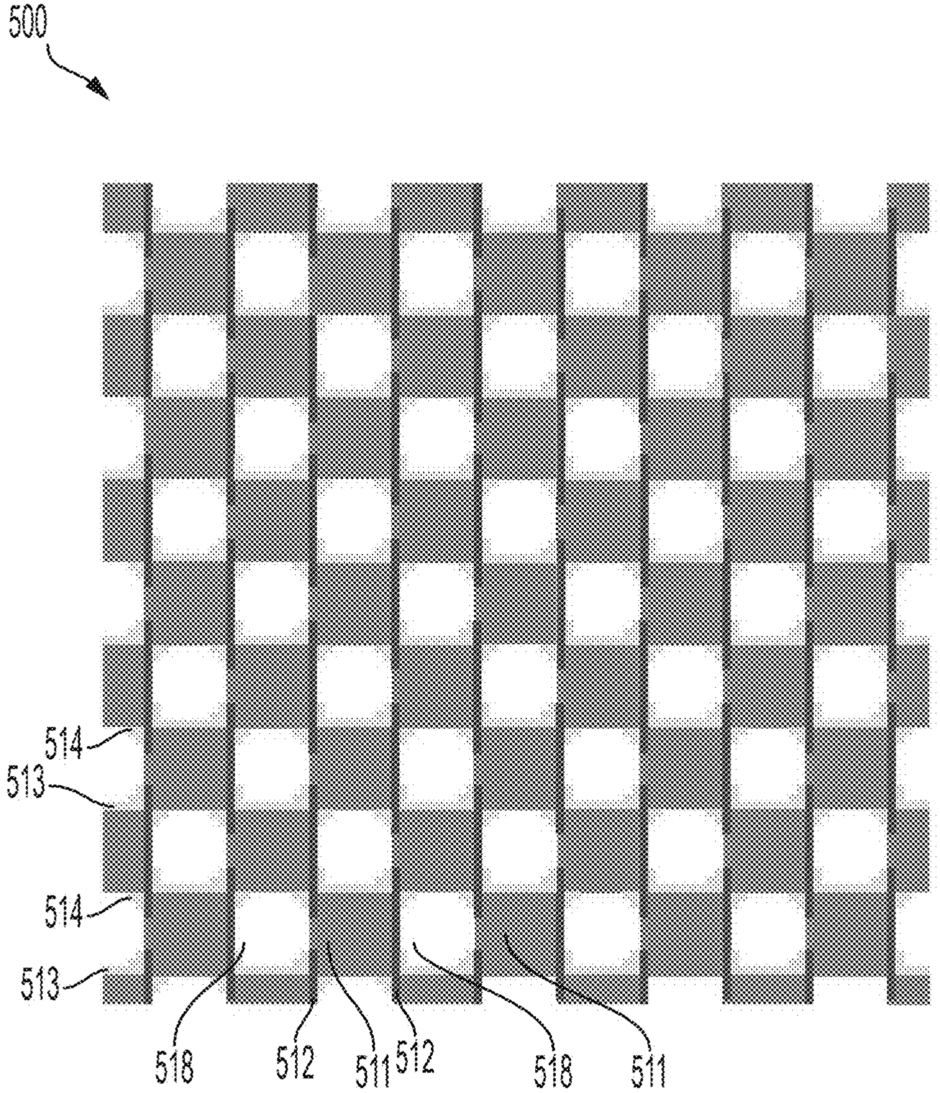
FIG. 5 illustrates an example of a pattern mark that can be generated via the process of FIG. 4.

FIG. 4 illustrates another method of generating a pattern mark and printing the pattern mark on a document. At 401 the processor will generate a checkered grid pattern in which every other cell exhibits a first color C1, and each such cell is surrounded on all four sides by cells that are white or a color other than that of first color C2. (This document may refer to the other color as color C2.) FIG. 5 illustrates an example grid pattern 500 that may be produced by the process of FIG. 4. In FIG. 5, every other cell of the first color is a cyan-colored cell C1 511 that is surrounded on all four sides by a white-colored cell C2 518. Thus, the grid pattern formed by the cyan-colored cells C1 511 and white-colored cells C2 518 is a checkered pattern (also known as a checkerboard pattern). The patterns shown may be considered to be a "solar window screen" in that they include a checkerboard pattern of relatively dark (non-white) cells 511 and relatively light or white cells 518, except that the relatively dark cells 511 will be colored cyan, magenta, or some color other than black.

At 402 the processor will generate a first set of broken parallel lines L1 512 using a third color C3 that is different from colors C1 and C2, and the processor will position the lines L1 along the edges of each of the cells in the grid pattern. The first set of broken parallel lines L1 512 thus may be positioned as gridlines in a single direction. Optionally, the broken parallel lines L1 512 may each have a width of one pixel or the smallest width that the print engine is capable of printing. In the example of FIG. 5, the broken parallel lines L1 512 are oriented to extend vertically and overlap with the C1-colored cells 511. However, in other embodiments the lines L1 may be oriented horizontally, positioned to overlap with the C2-colored cells 518, or both. In other embodiments, if gutters (i.e., small gridline spaces) exist between cells, the broken parallel lines L1 512 may be positioned in the gutters.

Optionally, as shown in FIG. 4 but not FIG. 5, at 403 the system may generate a second set of asymmetrically broken parallel lines L2 using color C3 or a different color. The second set of parallel lines L2 will be oriented perpendicular to the first set of broken parallel lines L1 512 and placed along the other edges of each of the cells in the grid pattern. Thus, for example, the first set of broken parallel lines L1 512 may serve as vertical gridlines and the second set of broken parallel lines L2 may serve as horizontal gridlines, or vice versa.

At 404 the system will generate a frame pattern that frames at least the corners, and optionally also some or all borders, of some or all cells of one of the colors in the grid pattern. The frame pattern will have a color C4 that differs from colors C1, C2, and C3. This is shown by way example in FIG. 5 as the yellow-colored frame pattern that includes frame elements 513 and 514. Some frame elements may only fill a corner of the cell (as with frame element 514) and extend into the cell with a width of only one pixel or two pixels in each direction, thus extending only partially into the cell while leaving most of the cell unchanged.

Some frame elements (such as frame element 513) may extend along some or all of the border of a cell with a width of only one pixel or two pixels in each direction, thus extending only partially into the cell while leaving most of the cell unchanged.

At 405 the system will render a pattern mark that includes the checkerboard pattern cells 511 and 518, the gridlines 512, and the frame elements 513 and 514. The pattern mark may be a checkerboard pattern such as that shown in FIG. 5. At 406, a print engine will print the pattern on a substrate. The pattern will be an enhanced moiré pattern that will cause the substrate to exhibit a "buzzing" effect when viewed at step 407.

Figure 6:
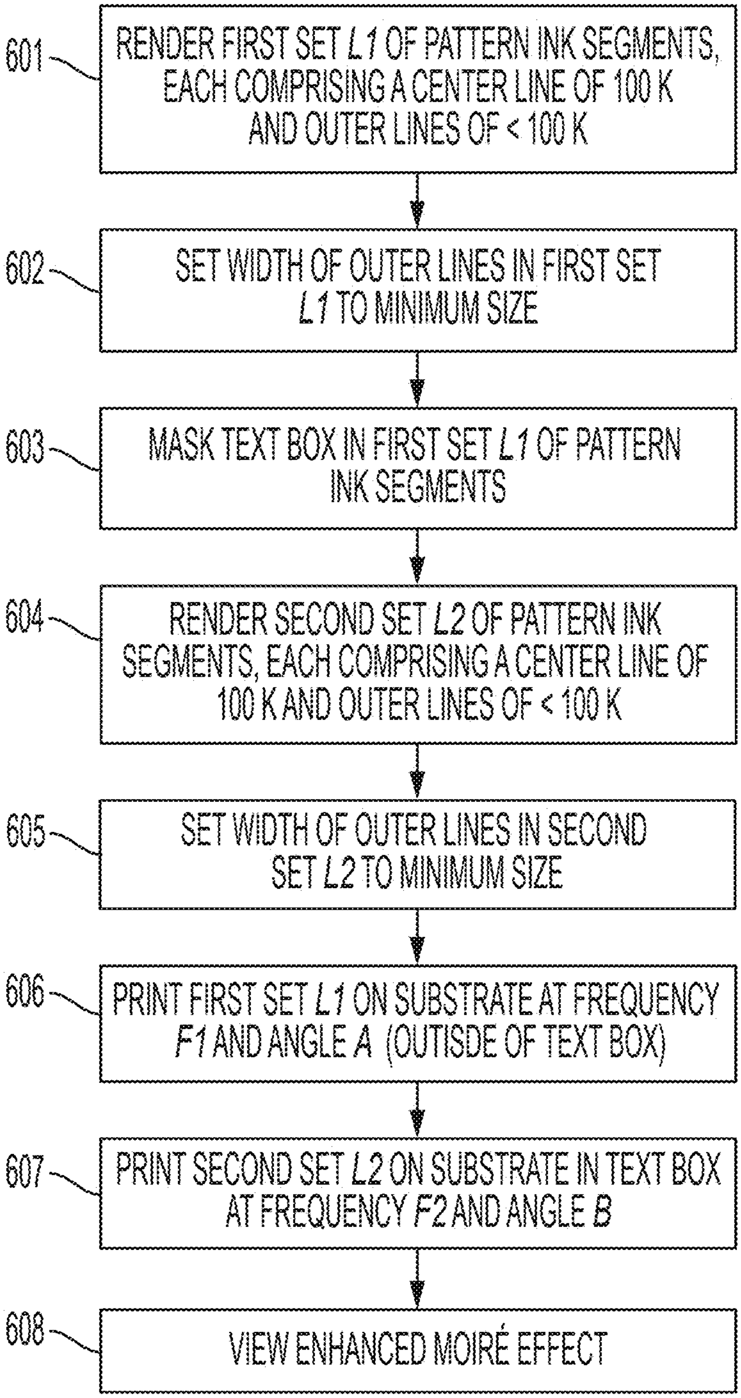
FIG. 6 is a flow diagram that illustrates a method of generating a monochromatic pattern mark that will exhibit an enhanced moiré effect when viewed.
Figure 7:
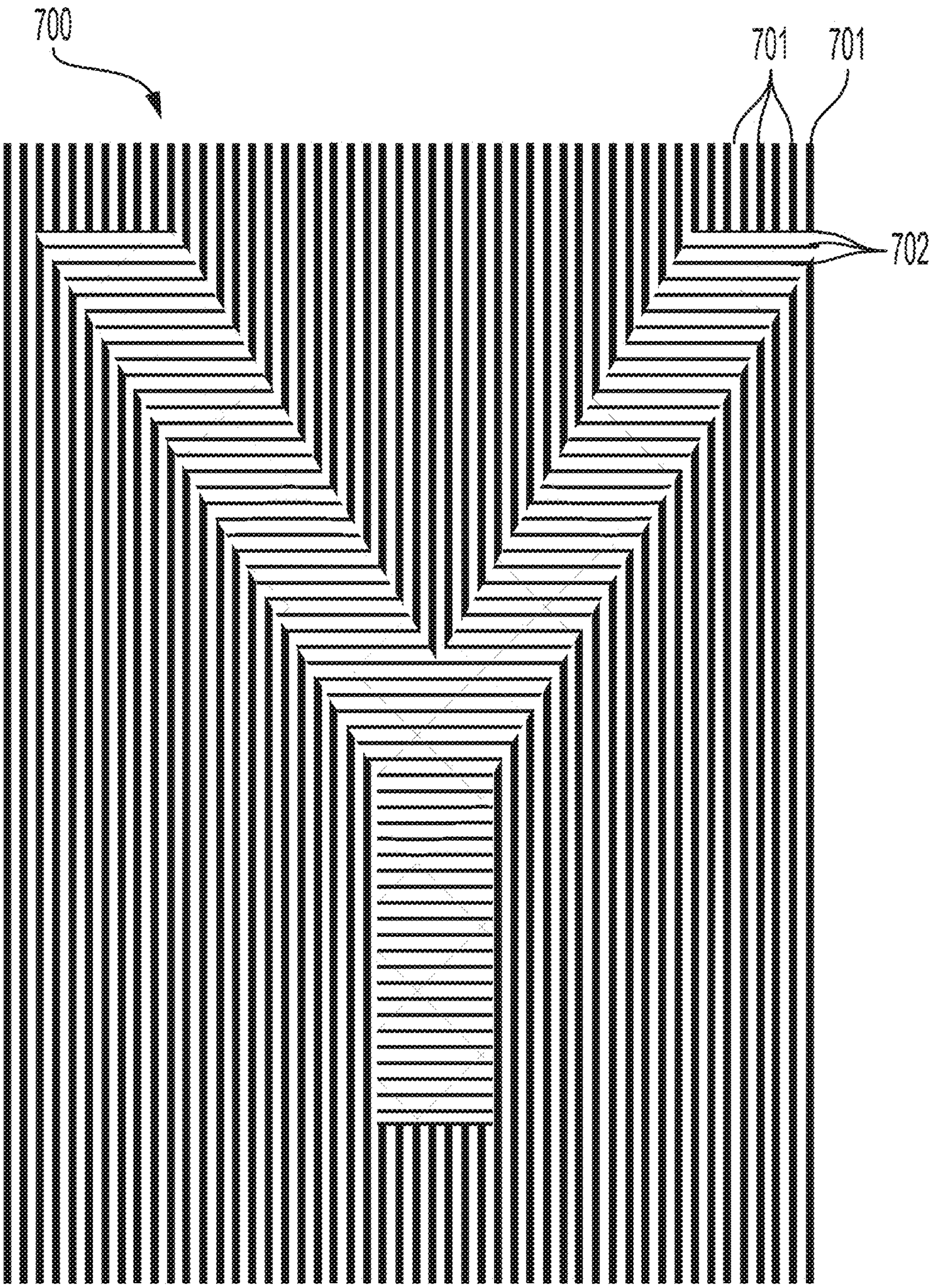
FIG. 7 illustrates an example of a pattern mark that can be generated via the process of FIG. 6.

FIG. 6 describes a second example of a method of printing a mark on a document. The process is similar to that shown in FIG. 1, expect that instead of printing a mark made up of lines of multiple colors, the mark is monochromatic. An example of such a monochromatic mark 700 is shown in FIG. 7. The process will include, at step 601, rendering a first set of pattern ink segments, each of which comprises a center line and with two outer lines, where the outer lines are adjacent to opposite sides of the center line. This is shown by way of example in FIG. 8A in which a pattern ink segment 800 includes a solid center line 801. One side of solid center line 801 is adjacent to a first dashed outer line 811, and the opposite second side of solid center line 801 is adjacent to a second dashed outer line 812. The first and second outer lines 811, 812 may exhibit the same dash patterns so that they are symmetrical with respect to each other, or they may exhibit different dash patterns and be asymmetrical with respect to each other. FIG. 8B is an exploded view of pattern ink segment 800 to help illustrate the individual components of the pattern ink segment in this example.

Figure 8A:
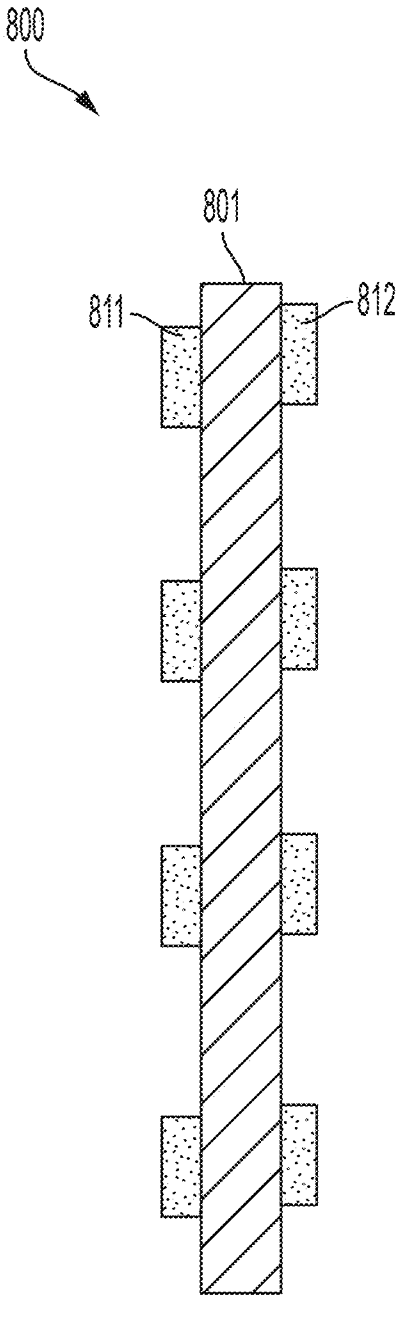
Figure 8B:
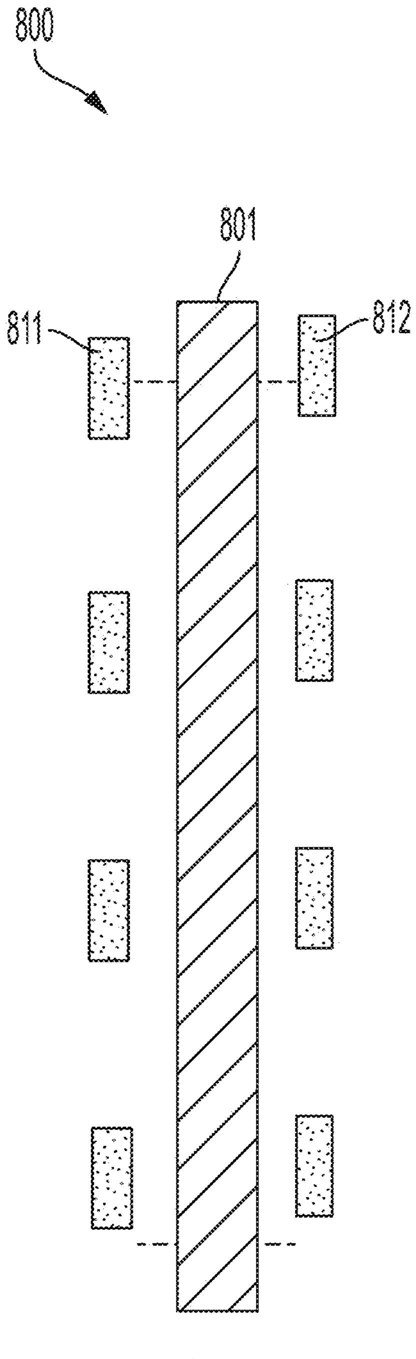
FIG. 8B is an exploded view of components of the pattern ink segment of FIG. 8A.

When rendering the pattern ink segments at step 601, as FIG. 8A shows the center line 801 of each pattern ink segment 800 will be rendered as black, which would be represented as approximately 100% K (black) in a CMYK color model. The outer lines 811, 812 of each pattern ink segment will be a shade of grey that is lighter than that of the center line (i.e., less than approximately 100% K).

At step 602 the process will set the width of each outer line 811, 812 of each pattern ink segment 800 to be approximately the minimum size that the print device is capable of printing, which is typically one pixel. The width of the center line 801 of each pattern ink segment 800 also may be the minimum size, or it may be wider than the outer lines 811, 812 as is illustrated in the example of FIGS. 8A and 6B.

At step 606, the print device will print the first set L1 of pattern ink segments on the substrate. These may be seen in FIG. 7 as pattern ink segments 701. The first set L1 of pattern ink segments will all be printed a common angle A with respect to an edge of the substrate and thus parallel to each other. For example, angle A may be an angle that is 90 degrees with respect to the top or bottom edge of the substrate, such as is illustrated by lines L1 701 in FIG. 7.

Optionally, the process of FIG. 6 may be used to display text or other characters having an enhanced moiré effect. This is shown in FIG. 7, in which a first pattern ink 701 surrounds a second pattern ink 702 that is the letter "Y". To accomplish this, before printing the first set L1 of pattern ink segments on the substrate, at step 603 the system may generate a text box mask corresponding to a shape of the characters that will be illustrated in the printed mark. At step 604 the system will render a second set L2 of pattern ink segments similar to those of FIG. 8A, in which each pattern ink segment 800 includes a center line 801 that is approximately 100% K and outer lines 811, 812 that are a shade of grey that is less than approximately 100% K. The frequency of the pattern ink segments in the second set L2 may be the same as or different from the frequency of the pattern ink segments in first set L1. At step 605 the process will set the width of each outer line each pattern ink segment in the second set L2 to be approximately the minimum size that the print device is capable of printing (typically one pixel). The width of the center line of each pattern ink segment in the second set also may be the minimum size, or it may be wider than the outer lines.

Then, when printing the first set L1 of pattern ink segments (step 606), the print engine will only print the L1 pattern ink segments outside of the mask, and it will print the L2 pattern ink segments within the mask. The second set L2 of pattern ink segments will all be printed (step 607) at a common angle B with respect to an edge of the substrate and thus parallel to each other, but substantially perpendicular to the L1 pattern ink segments. In other words, angle B will be an angle that is approximately plus or minus 90 degrees or 270 degrees away from angle A.

This is illustrated by lines L2 702 in FIG. 7. Marks printed by the process of FIG. 6, such as the example shown in FIG. 7, have an enhanced moiré pattern when viewed at step 608. The moiré pattern may be an enhanced moiré pattern that causes the substrate to exhibit an enhanced moiré effect (i.e., a "buzzing" effect). As previously noted, a buzzing effect is again one in which edges of some or all lines of the pattern will appear to be moving and/or intermittently flashing in the displayed video. The buzzing effect may be visible at step 608 by the human eye, through a loupe or other magnifying glass, or when viewed by a camera of an electronic device capturing a video of the mark and displaying the video on a display of the electronic device.

Figure 9:
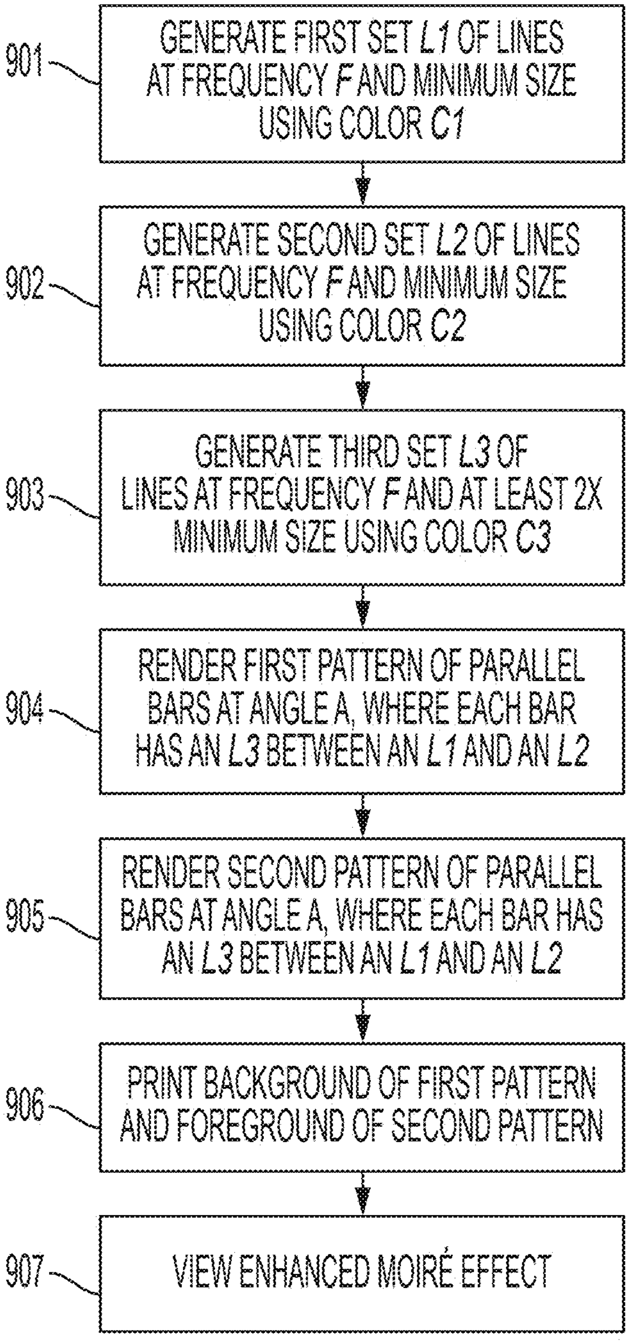
FIG. 9 is a flow diagram that illustrates a method of generating an alternate multicolored pattern mark that will exhibit an enhanced moiré effect when viewed.

FIG. 9 illustrates another example of a method of generating a mark and printing the mark on a document. The mark will comprise a first pattern ink in which bars of the pattern are printed at a frequency F and a first orientation (referred to below as angle A), and a second pattern ink in which bars of the pattern are printed at the frequency F and a second orientation that is substantially perpendicular to the first orientation (referred to below as angle B). As stated earlier in this document, the term frequency refers to the distance or number of pixels that separate a first instance of the bar from the next instance of the bar in the pattern.

Figure 10:
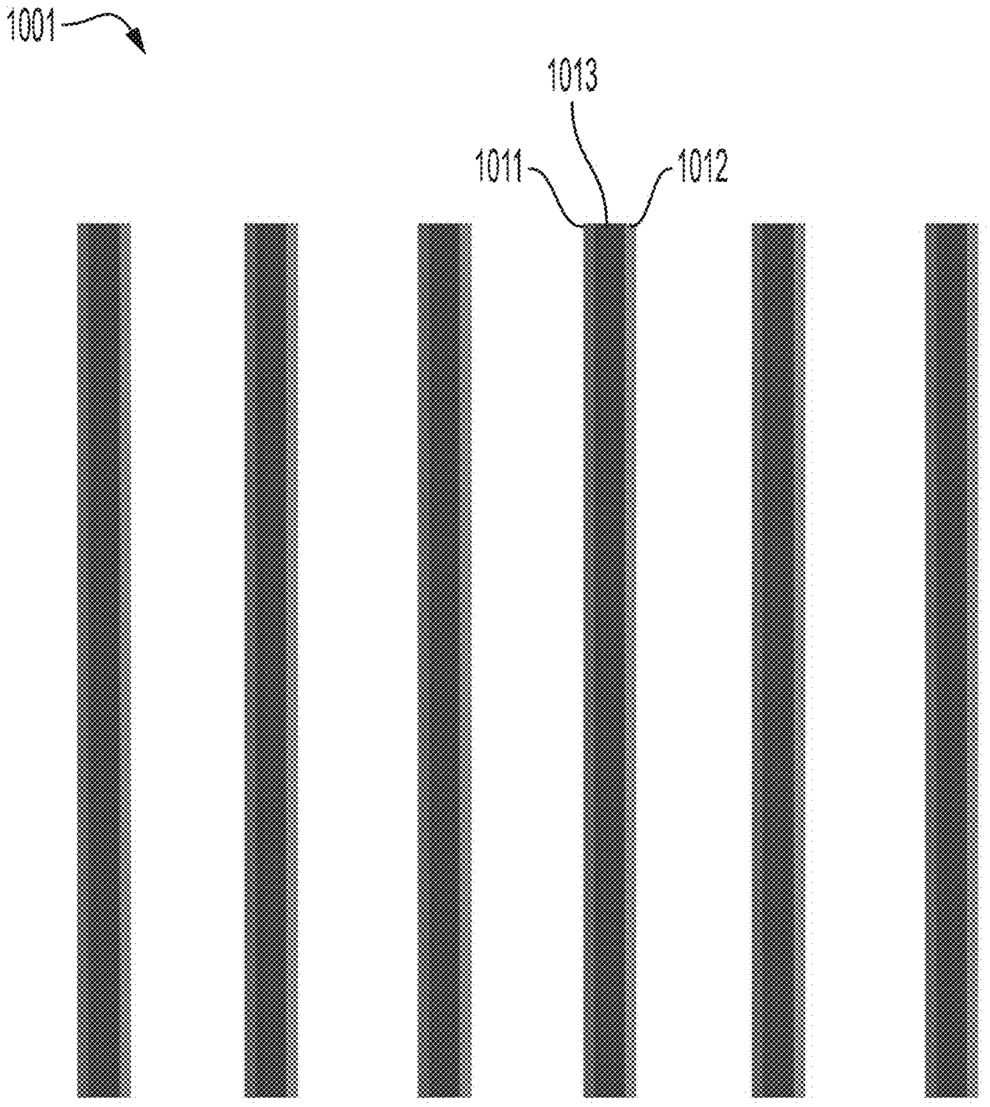
FIG. 10 illustrates a first pattern ink generated by the method of FIG. 9.

In the method of FIG. 9, and with reference to the magnified example pattern mark 1001 of FIG. 10, a processor of a print device will execute programming instructions embodied in a print file that cause a print engine of the print device to print a pattern within a boundary on a substrate. The process will include, at step 901, a processor generating a first set of parallel lines L1 at a frequency F using an ink of first color C1. The first set of lines L1 will all be printed parallel to each other and thus at a common angle A with respect to an edge of the substrate. The width of each line (i.e., the line's width at the thinnest dimension of the line) in first set L1 approximately the minimum size that the print device is capable of printing, which is typically one pixel. In FIG. 10, an example of such a line is the line 1011.

At step 902, the processor will generate a second set of lines L2 using ink of a second color C2 at the frequency F. The width of each line in second set L2 (illustrated by line 1012 in FIG. 10) also will be the approximately minimum size that the print device is capable of printing, which is typically one pixel. The second set of lines L2 also will all be printed parallel to each other and thus at a common angle A with respect to an edge of the substrate.

At step 903, the processor will generate a third set of lines L3 at the frequency F using ink of a third color C3. The lines in the third set L3 (illustrated in FIG. 10 by example line 1013) will have a width that is at least twice that of the width of any of the L1 lines or L2 lines, and thus at equal to or greater than the sum of the widths of the L1 lines and L2 lines. The third set of lines L3 also will all be printed parallel to each other and thus at a common angle A with respect to an edge of the substrate.

The ink colors C1, C2, and C3 will each be different from each other. However, in some embodiments at least two of the ink colors C1, C2, and C3 may be a metameric match. Inks are considered to be a metameric match if they are physically and/or compositionally different and thus have different spectral properties, but when viewed under visible light such as sunlight or that emitted by typical office or residential lighting fixtures, the inks appear to be the same color. When viewed under a type of light other than visible light, such as ultraviolet or infrared light, a metameric pair of inks will appear to be different colors. Methods of selecting inks that are a metameric match are disclosed by way of in U.S. Pat. No. 7,852,515 to Eschbach et al.

At 904, the system will then render a first pattern of parallel bars, oriented at the angle A. Referring to the example pattern mark 1001 of FIG. 10, each parallel bar will include a line of the third set L3 1013 positioned between a line of the first set L1 1011 and a line of the second set L2 1012. As shown in FIG. 10, each line L1 1001 may be printed adjacent to, or slightly overlapping with, a corresponding line 1002 of set L2 so that each line 1013 in set L3 has one side that contacts a corresponding line 1011 of set L1 and a corresponding line 1012 of set L2.

At 905, the system will then render a second pattern of parallel bars, oriented at an angle B that is substantially perpendicular to angle B. This pattern may be the same as pattern 1001 of FIG. 10, but approximately rotated 90 degrees or approximately 270 degrees.

Figure 11:
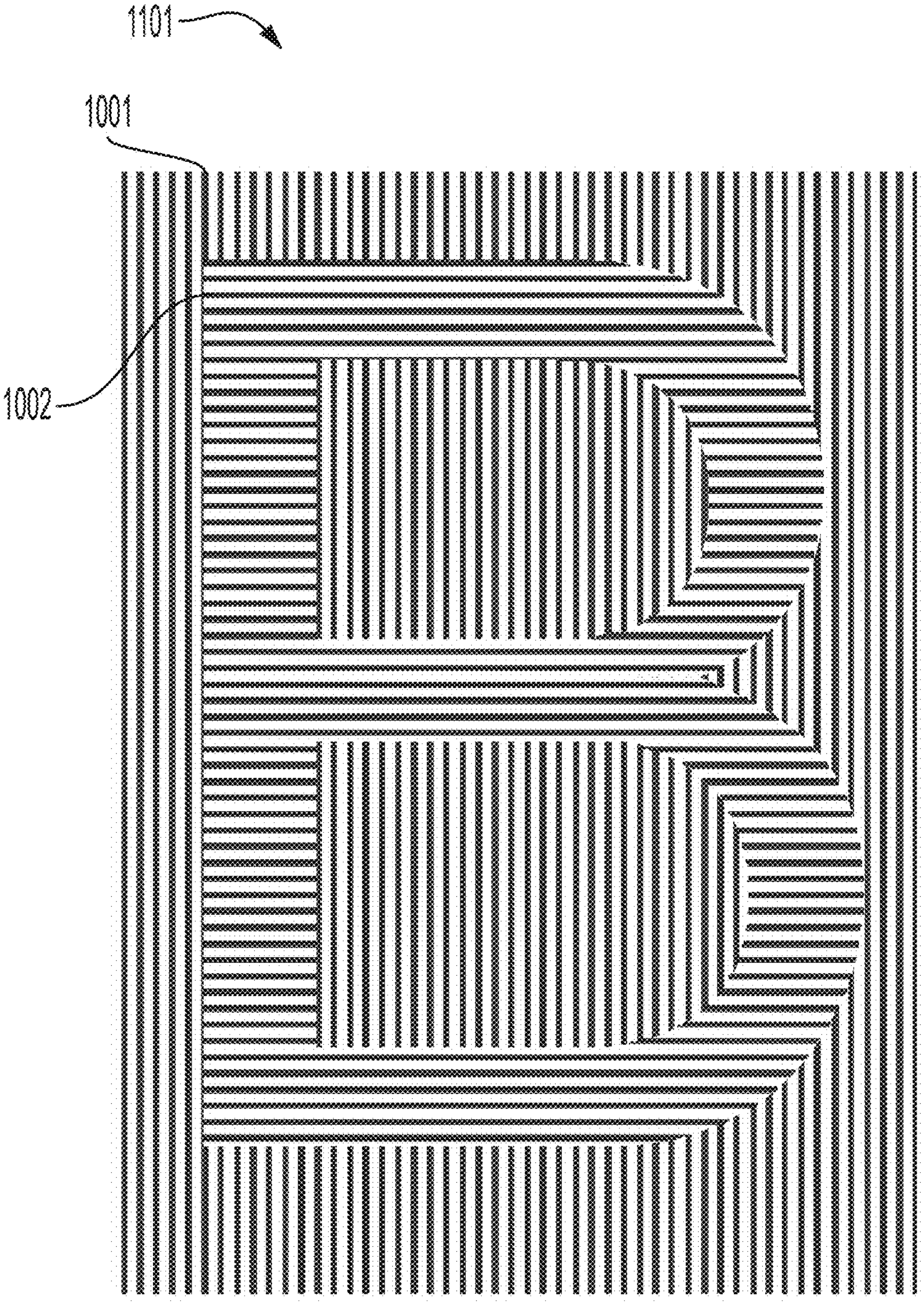
FIG. 11 illustrates an example mark comprising two pattern inks generated by the method of FIG. 9.

At 906, a print engine will print the first pattern of parallel bars in a background section of the print area and the second pattern of parallel bars in a foreground section of the print area. This is illustrated in FIG. 11, in which a print area includes a mark 1101 that includes a background section in which the first pattern 1001 is printed and a foreground section in which the second pattern 1002 is printed. In this example, the foreground section represents text (the letter "B"), but the foreground section and background section are merely used as relative terms with respect to each other. The method described above could also yield a mark in which the background section has horizontal lines and the foreground section includes vertical lines, and either of the two sections may include one or more alphanumeric characters (i.e., text and/or numbers).

Marks printed by the process of FIG. 9, such as the example shown in FIG. 11, have an enhanced moiré pattern that will cause the substrate to exhibit an enhanced moiré or "buzzing" effect when viewed at step 907. As with other embodiments described in this document, the buzzing effect of each pattern within the mark may be visible at step 907 by the human eye without a camera or other device, and/or when viewed by a camera of an electronic device capturing a video of the mark and displaying the video on a display of the electronic device. When viewed with a camera, the overall mark may exhibit an additional buzzing effect.

Figure 12:
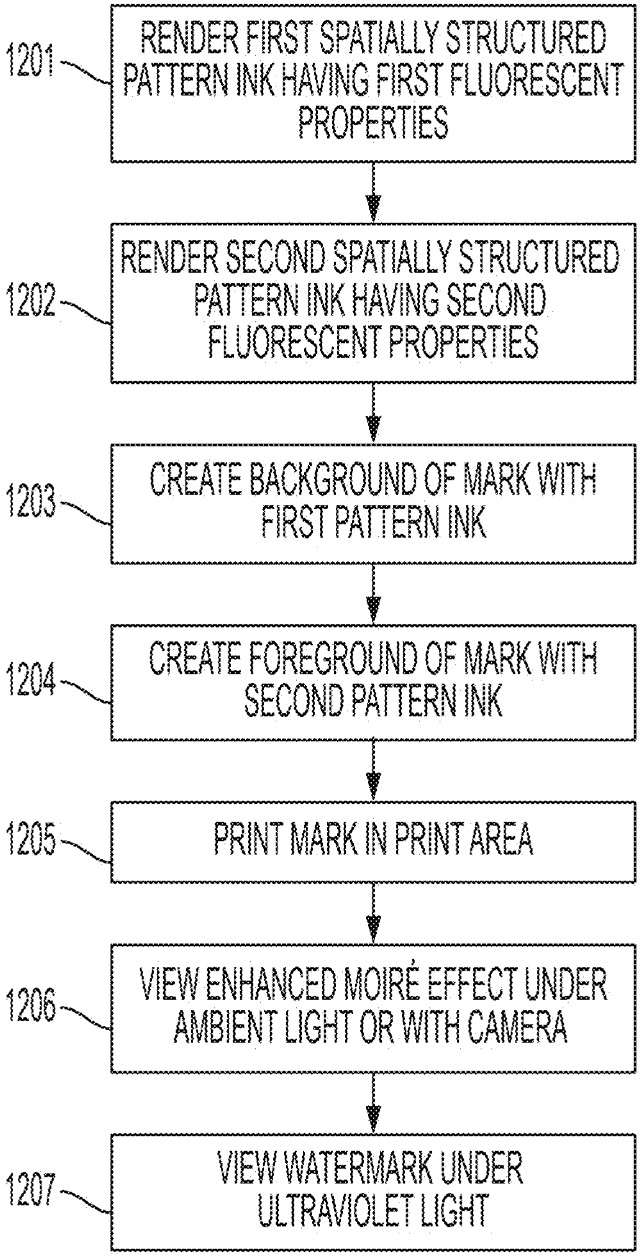
FIG. 12 is a flow diagram that illustrates a method of adding a fluorescent watermark to an area of the document that includes an enhanced moiré pattern mark.

FIG. 12 illustrates another method of printing a mark on a document. The mark includes at least two pattern inks within a print area. FIG. 12 uses a process that creates the first pattern ink at step 1201. The first pattern ink will include an enhanced moiré effect pattern (and optionally an enhanced moiré pattern) generated by processes such as those described in FIG. 1, FIG. 4, or FIG. 9. In the process of FIG. 12, the first pattern ink comprises a pattern (i.e., an arrangement of pixels) that blocks ultraviolet (UV) light-triggered fluorescence of the underlying substrate by a particular amount. In some embodiments, the first pattern ink may substantially block UV fluorescence of the substrate, where "substantially blocks" means that the pattern ink significantly reduces any UV-triggered fluorescence of the underlying substrate when the substrate is viewed under UV illumination, such as by reducing the intensity of the emission by at least fifty percent.

Methods of rendering such a pattern ink are described by way of example in U.S. Pat. No. 8,779,602, the disclosure of which is fully incorporated into this document by reference, which refers to such a pattern ink as a "spatially-structured pattern ink". To create a spatially-structured pattern ink, the system may access a defined set of eight (by way of example) or another limited number of distinct colors, or "spot colors" as they are commonly known that are particularly suitable for UV imaging in that they will not be altered by color management tools used by the print device. The system will then create the pattern inks that group the spot colors into spatial structures that are a tile or other repeating pattern.

At step 1202, the process includes generating a second pattern ink. The second pattern ink will be a spatially-structured pattern ink that blocks the UV light-triggered fluorescence of the underlying substrate by an amount that is relatively less than the amount by which the first pattern ink blocks such fluorescence. For example, the first pattern ink may block the UV light-triggered fluorescence of the underlying substrate by a first amount, while the second pattern ink may block the UV light-triggered fluorescence of the underlying substrate by a second amount that is less than the first amount. This may be accomplished, for example, by the first pattern ink having a sufficiently different number of white pixels than the second pattern ink to cause the hidden mark to become visible under UV illumination. (In this example, what is "sufficiently different" will depend on the size of the pattern marks and print area.) In some embodiments, the second pattern ink may substantially pass UV fluorescence of the substrate, where "substantially passes" means that the pattern ink does not significantly reduce any UV-triggered fluorescence of the underlying substrate when the substrate is viewed under UV illumination, such as by reducing the intensity of the emission by less than least fifty percent and/or at least a threshold difference away from the reduction caused by the first pattern ink.

Steps 1201 and 1202 may be reversed or performed in parallel, and in some cases the first pattern ink may substantially pass UV light-triggered fluorescence of the underlying substrate while the second pattern ink may substantially block such fluorescence. In either case both pattern inks will appear to be the same color when viewed under ambient light, so that the first pattern ink is not distinguishable from the second pattern ink in ambient light (and not under UV light).

The system will then create a watermark in which the first pattern ink is used as the background of the mark at 1203, and the second pattern ink is used as the foreground of the mark at 1204. The foreground may include a code, text, image, or other item that is hidden when viewed in ambient light, but which becomes visible when viewed under infrared light. At 1205 a print device will then print the mark in a print area of a substrate.

Figure 13A:
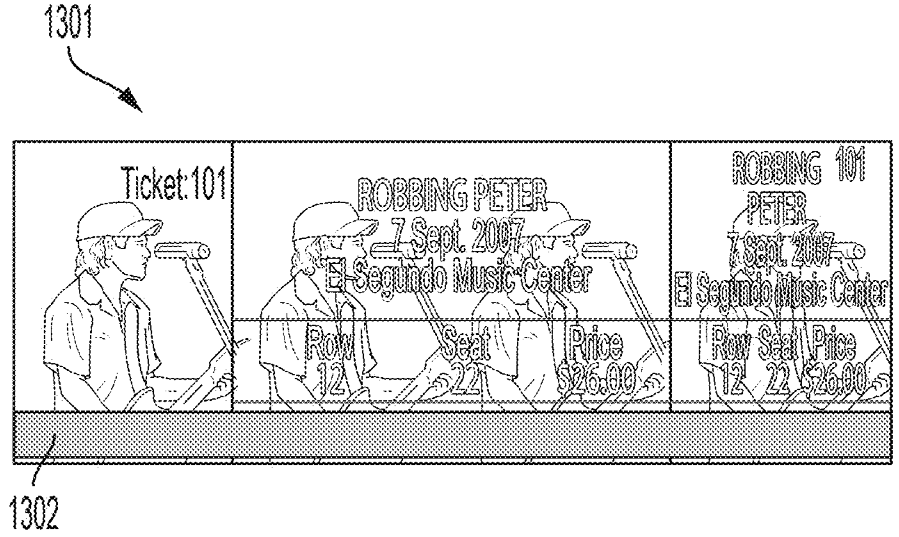
FIGS. 13A and 13B illustrate an example of a document on which a print area includes content printed with two inks that are a metameric match.
Figure 13B:
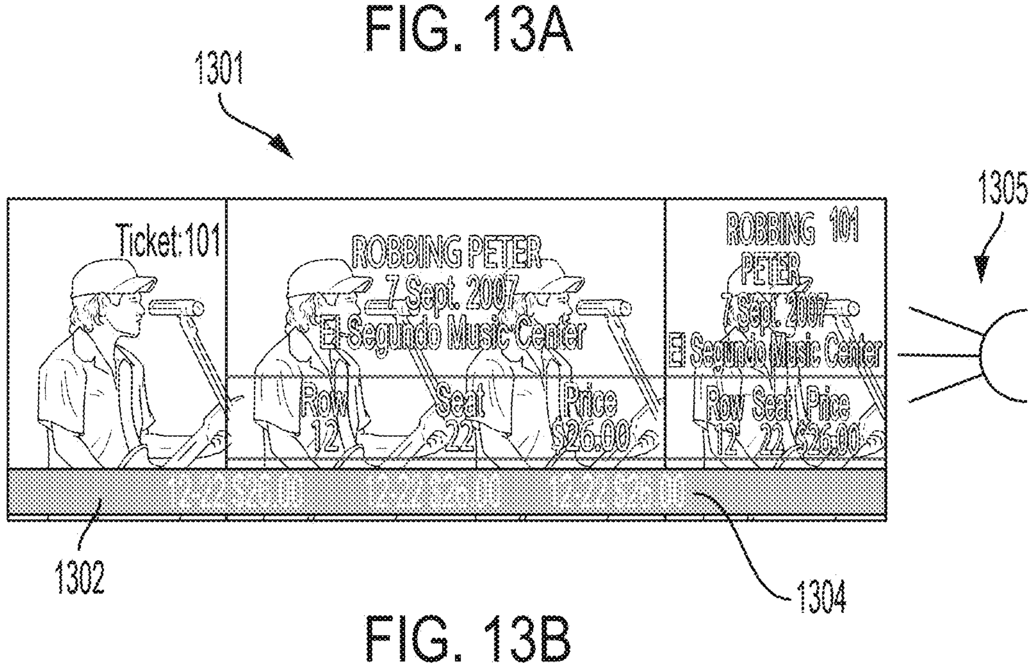

FIGS. 13A and 13B illustrate an example of such a pattern, where a concert ticket 1301 includes a print area 1302 in which no text is visible under ambient light, as shown in FIG. 13A. However, when the ticket 1301 is placed under ultraviolet light 1305, a security mark 1304 that was printed with fluorescent ink becomes visible in the print area 1302.

Figure 14:
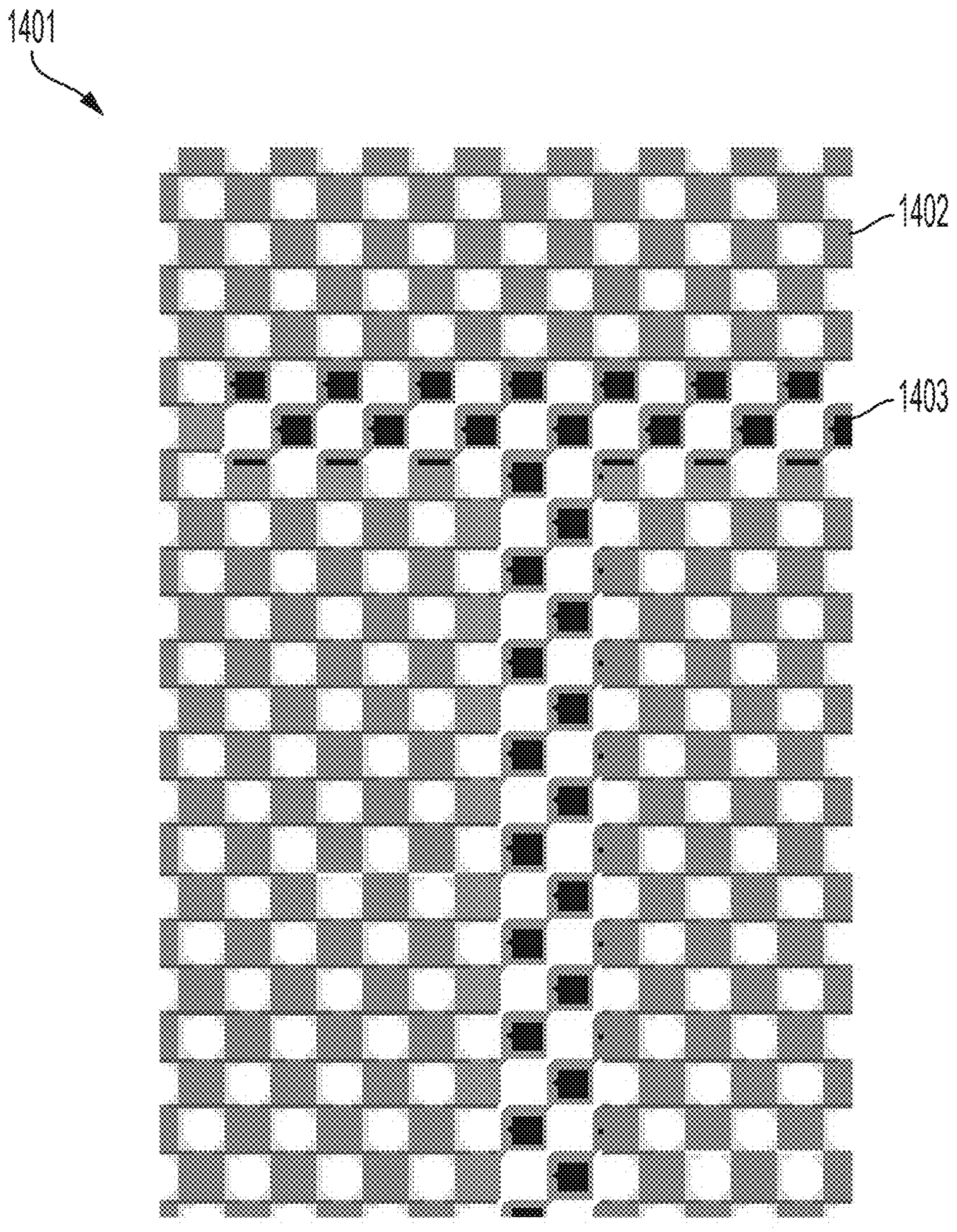
FIG. 14 illustrates an example of a mark that includes an enhanced moiré pattern, along with content printed within the enhanced moiré pattern.

At step 1206 the enhanced moiré effect pattern(s) may be viewed by a human eye or captured by a digital camera and displayed on a display. Optionally, each moiré pattern may be an enhanced moiré pattern that exhibits a buzzing effect as described in previous embodiments. At 1207 the combined fluorescent ink watermark may be viewed when placed under visible light. FIG. 14 illustrates an example of such a combined mark 1401. The combined mark 1401 includes a background element 1402 that is a first pattern ink which appears to be similar to that shown in FIG. 5, along with foreground element 1403 that is a second pattern ink having different fluorescent properties than the first pattern ink. The first mark element 1402, the second mark element 1403, or both may exhibit an enhanced moiré pattern that causes the substrate to exhibit an enhanced moiré effect. In this example, the second mark element 1403 is in the shape of the letter "T", and it is shown in black ink for purposes of illustration, and it will not be visible unless viewed under ultraviolet light.

Figure 15A:
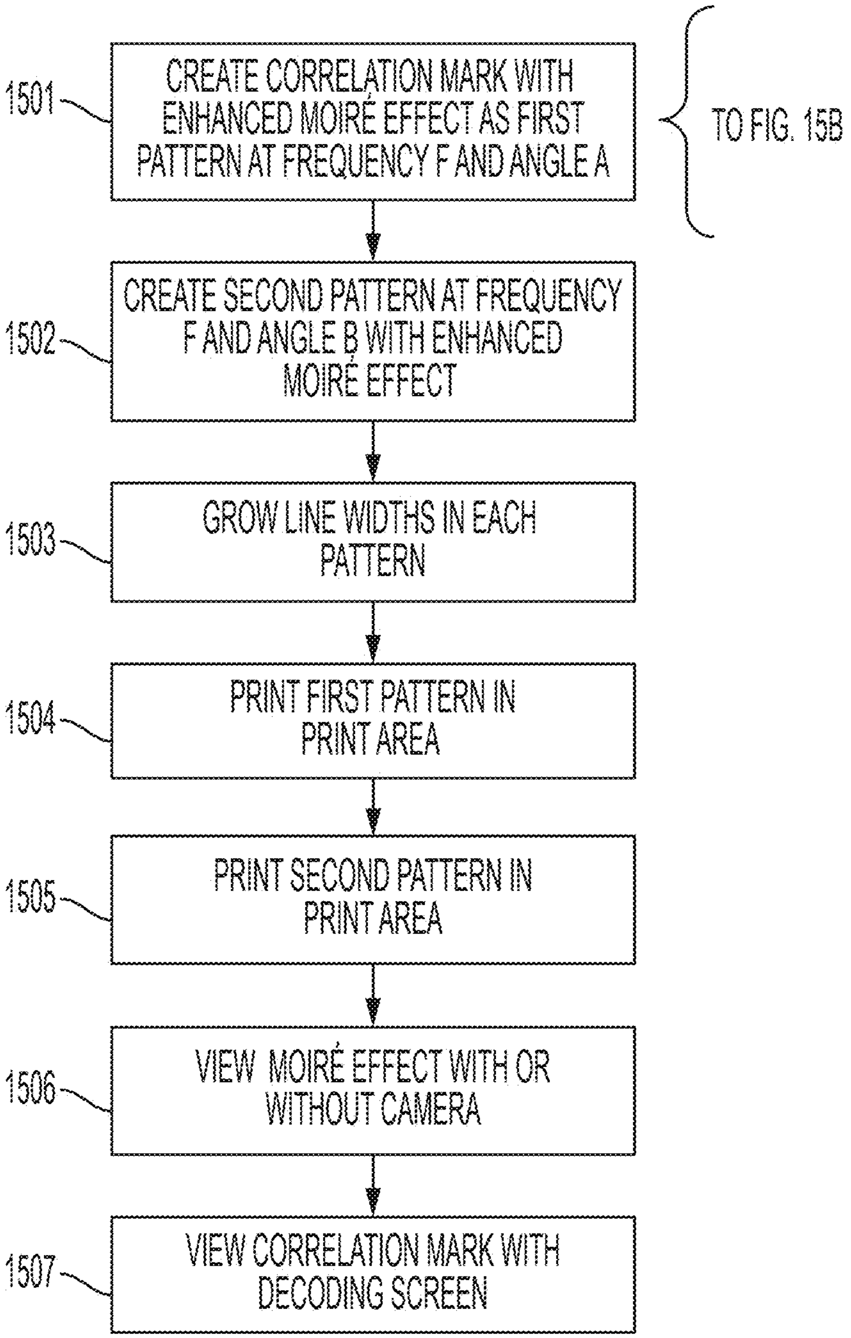
FIGS. 15A and 15B illustrate a method of adding a fluorescent watermark to an area of the document that includes an enhanced moiré pattern mark.
Figure 15B:
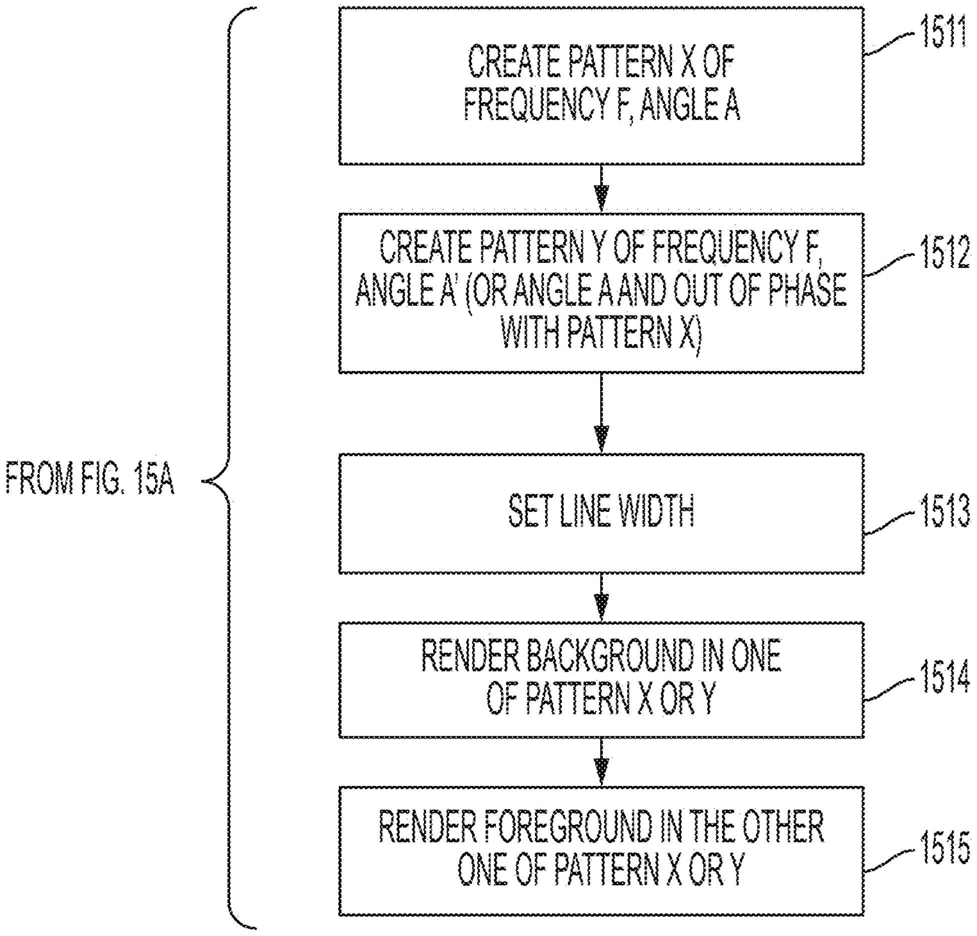

FIGS. 15A and 15B illustrate another method of printing a mark on a document. The mark is of a type generally known as a correlation mark, but which is modified to exhibit an enhanced moiré effect.

At 1501 the process will render a first pattern that will exhibit an enhanced moiré effect, and which also exhibits a pattern corresponding to a correlation mark. As noted earlier in this document, a correlation mark is a mark includes one or more elements that are invisible or hardly visible on a printed document, and the hidden elements become visible when the document is viewed through a correlation mask that serves as a "key" to the correlation mark.

The system may use any suitable process to generate a correlation mark. For example, the system at 1511 the system may render a first pattern ink that includes a pattern of lines that will be printed at a frequency F and angle A. At 1512 the system will generate a second pattern ink that includes a pattern of lines that will be printed at the frequency F and either angle A or an angle A' that is approximately 90 degrees from angle A. Thus, the lines in each pattern have the same frequency. In some embodiments, the lines of the second pattern may be parallel to those of the first pattern (i.e., both oriented at angle A) but out of phase with the lines of the first pattern. In these embodiments, the individual patterns may exhibit an enhanced moiré effect, but the overall mark would not do so. In other embodiments, the lines of the second pattern may be orthogonal (perpendicular) to those of the first pattern (i.e., oriented at angle A'). In these embodiments, the individual patterns may exhibit an enhanced moiré effect and the overall mark also would exhibit an enhanced moiré effect.

At 1513 the system will set a width for the lines that the printer will use to print the pattern. For example, in the embodiments of this disclosure, a width of one pixel, or the smallest width that the printer is capable of printing, may be used.

Figure 16A:
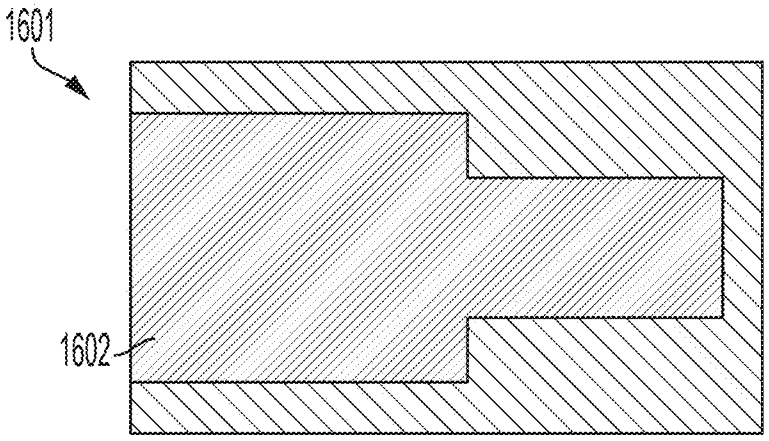
FIGS. 16A and 16B illustrate an example of a document on which a correlation mark is printed.
Figure 16B:
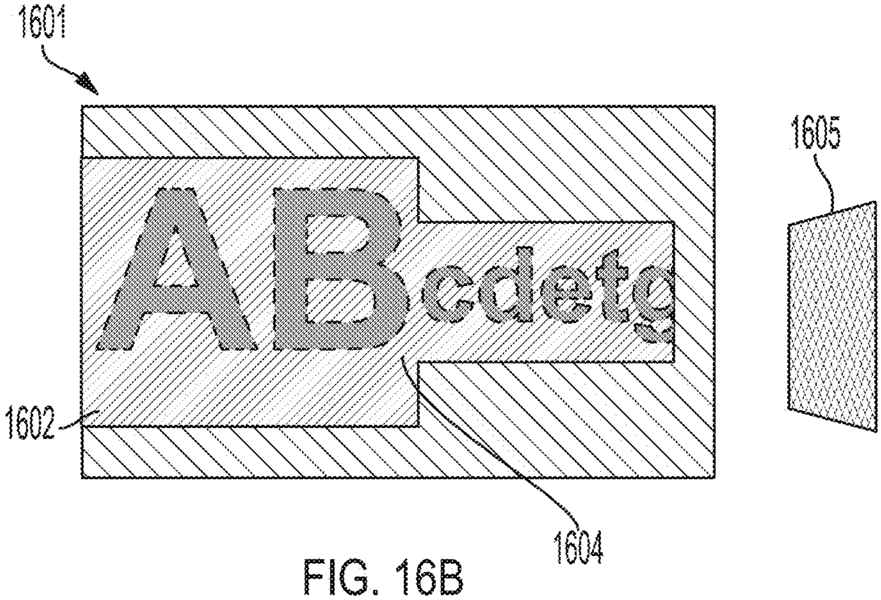

The system will then render one of the two patterns to be the background of the print area at 1514, and it will render the other of the two patterns to be the foreground of the print area at 1415. For example, as shown in FIG. 16B, the first pattern may be used to render print area 1602 as a text box, and the second pattern may be used to render a security mark 1604 as text that will appear in the text box when viewed with a decoding screen.

The pattern in the mask may be viewed through a mask or decoding screen that corresponds to pixel elements of mark. Aligning the correlation mask to the printed document or image causes a correlation image to become visible. The correlation mark may contain code, text, an image, a watermark, or other item that will only be visible with the decoding screen. FIGS. 16A and 16B illustrate an example of such a pattern, where a document 1601 includes a print area 1602 in which no text is visible, as shown in FIG. 16A. However, when the document 1601 is viewed through a decoding screen 1605, a security mark 1604 becomes visible in the print area 1602 as shown in FIG. 16B.

Returning to FIGS. 15A and 15B, the process also creates a second pattern at step 1502. The second pattern may be, not does not need to be, a pattern that exhibits any moiré effect. The second pattern will also include a set of lines that will be printed at the same frequency F as the first pattern, but at a second angle B that is approximately 90 degrees or approximately 270 degrees away from angle A. Thus, the lines of the first pattern and second pattern will be substantially perpendicular to each other. The first pattern and second pattern will each be initially rendered in a first color that is the same or at least not visibly different when viewed with the naked eye or a camera.

At 1503 the processor will expand the width of the lines (originally set in step 1513) of one or both patterns by growing each line by a specified width, using a color that is different from the color of the original portion of the line. For example, the process may add a single pixel at 1200 dpi line (or ½ pixel at 600 dpi, or some other size that is the smallest size that the printer is capable of printing) to each line of one or both patterns, using a color that is different from that of the original portion of the line.

At 1504 a print engine will print the first pattern (the moiré pattern) in a print area on a substrate, and at 1505 the print engine will print the second pattern (the correlation mark) in the print area. The print engine will apply the first and second patterns to the substrate so that at least a portion of the second pattern is printed in the same space as the first pattern.

At step 1506 the enhanced moiré effect pattern may be viewed by a human eye or captured by a digital camera and displayed on a display. At 1507 the correlation mark watermark may be viewed through a decoding screen. As used in this document, the term "decoding screen" mean a physical or digital interface that can enable a user to decode watermarked information embedded in an image. The decoding screen may include an image processing filter, mathematical algorithm, or physical structure that enables the watermark to become visible.

Figure 17A:
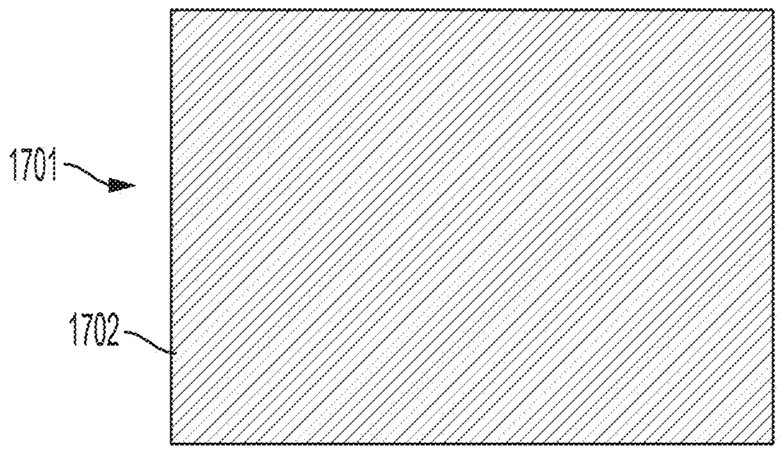
FIGS. 17A and 17B illustrate an example of a mark that includes an enhanced moiré pattern, along with a correlation mark.
Figure 17B:
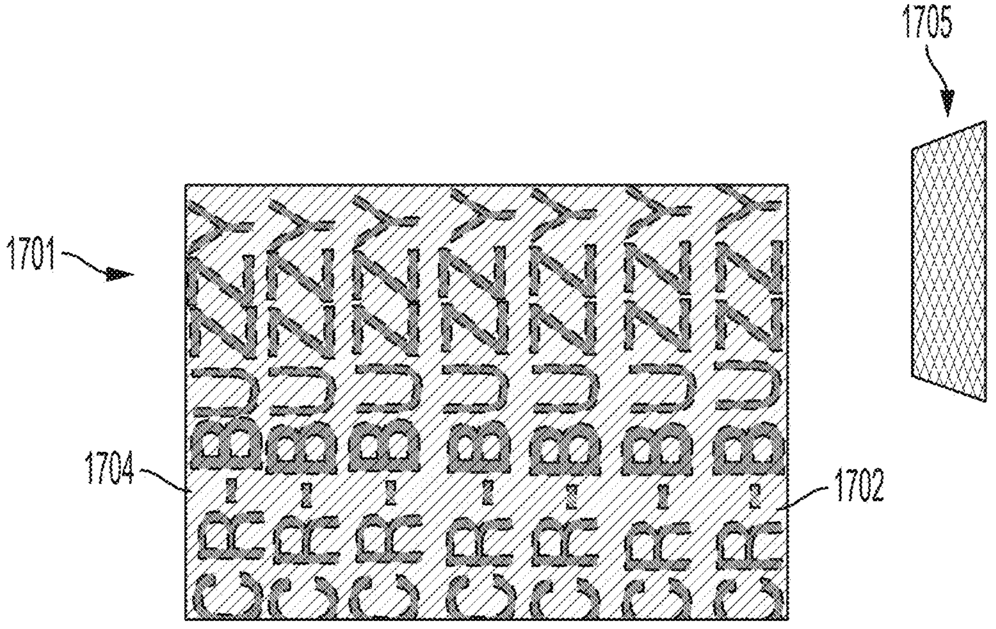

FIGS. 17A and 17B illustrate an example of such a combined mark 1701. FIG. 17A illustrates how the mark 1701 may appear without use of a decoding screen, while FIG. 17B illustrates how the mark 1701 may appear when viewed through a decoding screen 1705. The combined mark 1701 includes an enhanced moiré effect mark element 1704, along with a correlation mark element 1703, which in this example also is an enhanced moiré pattern that displays the phrase "CR-BUZZY". Thus, the combined mark causes the substrate to exhibit an enhanced moiré effect.

The marks shown in this document and/or created by the methods described in this document can have applications beyond security printing. For example, marks with moiré effects created according to the methods of this document may be applied to advertisements, product labels, greeting cards, and other substrates in which the substrate's distributor desires to create a unique, eye-catching, and perhaps even viral experience for users that view the substrates through their smartphone cameras.

Figure 18:
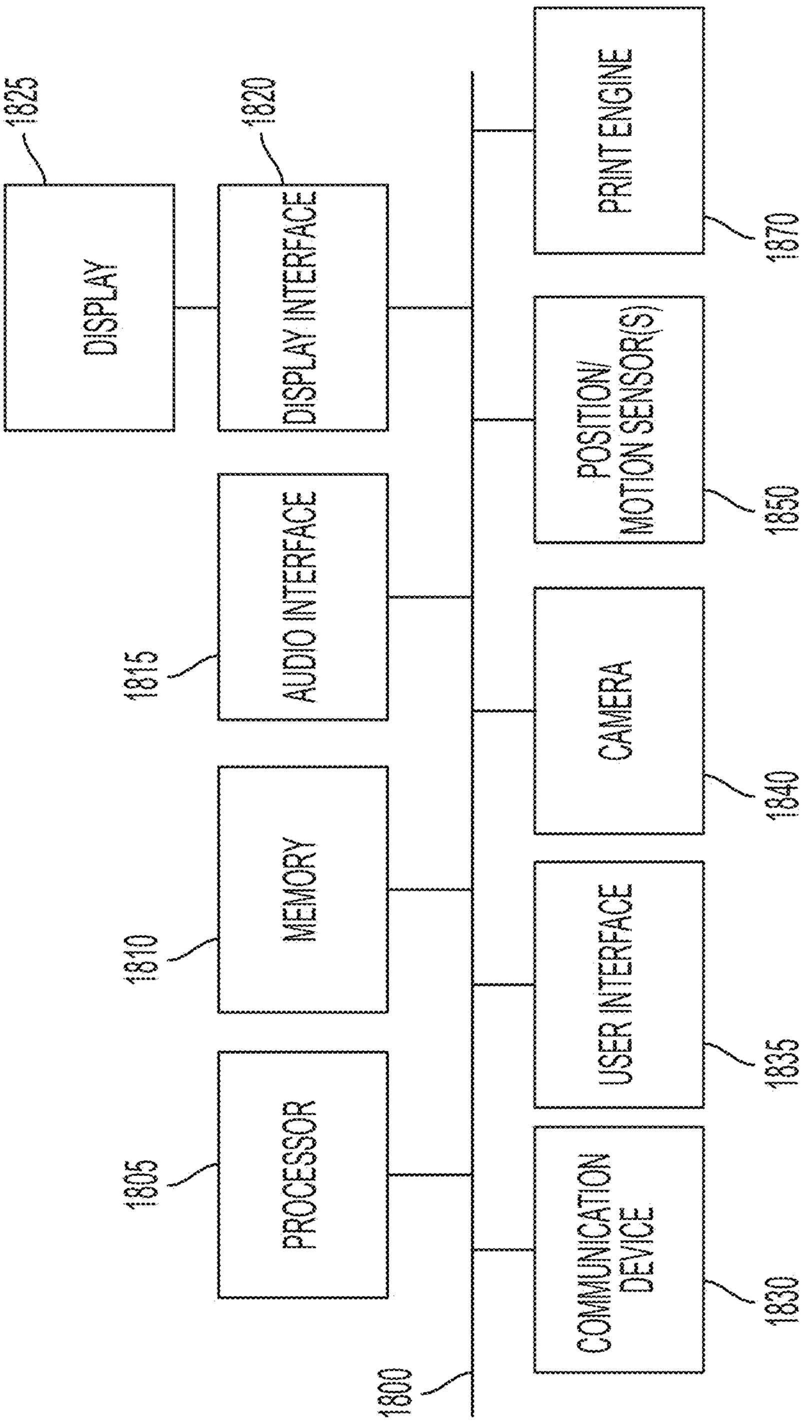
FIG. 18 is a block diagram illustrating elements of various electronic devices that may be used in aspects of this disclosure, such as print devices and computing devices.

FIG. 18 depicts an example of internal hardware that may be included in any of the electronic components of the system, such as a smartphone, a tablet computing device, a print device, or a local or remote computing device in the system. A conductive path such as a bus 1800 serves as a communication path via which messages, instructions, data, or other information may be shared among the other illustrated components of the hardware. Processor 1805 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 1810. A memory device may include a single device or a collection of devices across which data and/or instructions are stored.

An optional display interface 1825 may enable information to be displayed on a display device 1825 in visual, graphic or alphanumeric format. An audio interface 1815 with audio output (such as a speaker) also may be provided. Communication with external devices may occur using various communication devices 1830 such as a wireless antenna, a radio frequency identification (RFID) tag and/or short-range or near-field communication transceiver, each of which may optionally communicatively connect with other components of the device via one or more communication systems. The communication device 1830 may be configured to be communicatively connected to a communications network, such as the Internet, a local area network or a cellular telephone data network.

The hardware may also include a user interface device 1835 that includes one or more input devices that can receive data and/or commands from a user. Example user interface devices 1835 include a keyboard, a mouse, touchscreen, a touch pad, a remote control, a pointing device, and/or a microphone. A camera 1840 may include image sensors and other hardware that can capture video and/or still images. The system also may include one or more positional and/or motion sensors 1850 that can detect position and movement of the device. Examples of motion sensors include gyroscopes, accelerometers, and inertial measurement units (IMUs). Examples of positional sensors include a global positioning system (GPS) sensor device that receives positional data from an external GPS network.

In embodiments where the electronic device is a print device, the hardware also may include a print engine 1870 that is configured to apply ink and/or toner to a substrate. Example components of a print engine include a printhead, along with marking material storage and delivery components such as a print cartridge containing ink, toner, or another marking material. A typical print engine also includes conveyors, rollers, and/or other media transport components that are configured to move a substrate past the printhead so that the printhead may printed characters and/or images onto various locations of the substrate. In an inkjet printing system, the marking material storage and delivery components may include one or more print heads arranged in an array or other arrangement that eject ink drops onto the substrate. In a laser printer, the marking material storage and delivery components may include toner, a laser, and related components configured to transfer the toner onto the substrate.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 17.

The term "image" refers to a pattern of physical light or a collection of data representing the physical light, may include characters, words, symbologies, graphics and other features, as well as combinations thereof. A "digital image" is by extension an image represented by a collection of digital data in one or more data files. In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

In this document, the term "imaging device" or "camera" refers generally to a hardware sensor that is configured to acquire digital images. An imaging device may capture still and/or video images, and optionally may be used for other imagery-related applications. For example, an imaging device can be held by a user such as a DSLR (digital single lens reflex) camera, cell phone camera, or video camera. The imaging device may be part of an image capturing system that includes other hardware components, such as a smartphone or a tablet computing device.

In this document, the term "ink" refers to a colorant, which is a material that imparts a color on a substrate. Inks impart color by altering the spectral power distribution of the light they receive from the incident illumination through two primary physical phenomenon: absorption and scattering. Color is produced by spectrally selective absorption and scattering of the incident light, while allowing for transmission/reflection of the remaining light. For example, cyan, magenta and yellow colorants selectively absorb long, medium, and short wavelengths respectively in the spectral regions. Some colorants, such as most colored toners, impart color via a dye operable in transmissive mode. Other suitable colorants may operate in a reflective mode. Some colorants are dye-based, other colorants are pigment-based. For the purposes of discussion in this specification but not to be limited to same, colorant will be taken to be one of the fundamental subtractive C, M, Y, K (cyan, magenta, yellow, and black) primaries, which may be realized in formulation as liquid ink, solid ink, dye, or electrostatographic toner.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

A "moiré pattern" is generally known in the art as an interference pattern that results when one pattern is overlaid on a second, similar pattern. When compared to the first pattern element, the second pattern element of the moiré pattern is slightly displaced, rotated, or placed with a different pitch. The interference between the first and second patterns can cause the visual effect of apparent movement in the overall moiré pattern. This document also describes methods of producing an "enhanced moiré pattern" or a mark that causes a substrate to exhibit an "enhanced moiré effect", which means that the pattern, when visibly perceived, appears to exhibit a "buzzing" effect in which edges of some or all lines of the pattern will appear to be moving and/or intermittently flashing.

The terms "pattern ink" and "pattern mark" refer to a mark that is or will be printed in repeating patterns or designs on a substrate. Each instance of the pattern of a pattern ink is a grid or tile of pixels, where each pixel has a specified combination of colors (i.e., CMYK combinations). Pattern inks are sometimes used to provide a visual representation of different components of an object (such as with different dot patterns or cross hatching patterns). Pattern inks may be printed using inks of multiple colors or an ink of a single color.

The terms "printer" and "print device" refer to a machine having hardware capable of reading digital data, and then using the information from the data and associated print instructions to print a physical document on a substrate. In some embodiments, a print device may have additional capabilities such as scanning or faxing and thus may be a multifunction device. Example print devices include traditional printers and multi-function devices, as well as specialized print devices such as ticket printers, sales receipt printers, and the like. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In embodiments that print a 3D object, the print device may be a 3D printer that can use a digital model to successively place layers of build material on a substrate in a configuration that results in a 3D object.

The terms "print file" and "print job" refer to set of one or more digital files that contain instructions and print parameters that, when processed by a print device, will guide operation of the print device and thus cause a document to be printed.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The features and functions described above, as well as alternatives, may be combined into many other different systems or applications. Various alternatives, modifications, variations or improvements may be made by those skilled in the art, each of which is also intended to be encompassed by the disclosed embodiments.

As described above, this document discloses system, method, and computer program product embodiments. The system embodiments include a local computing device, which may have access to one or more remote computing devices. In some embodiments, one or more of the remote computing devices also may be part of the system. The computer program embodiments include programming instructions, stored in a memory device, that are configured to cause a processor to perform the methods described in this document.

Without excluding further possible embodiments, certain example embodiments are summarized in the following clauses:

Clause 1: A method of printing a mark on a substrate, the method comprising, by a processor, generating a pattern mark to be printed within a boundary on a substrate by: (a) generating a first set L1 of parallel lines to be printed at a first frequency F1 and first angle A using a first color C1; (b) generating a second set L2 of parallel lines to be printed at the first frequency F1 and first angle A using a second color C2, wherein the lines of the second set L2 have a width that is a minimum width that can be printed by the print engine; (c) generating a third set L3 of parallel lines to be printed at a second frequency F2 and a second angle B using a third color C3, wherein the second angle B is plus or minus approximately 90 degrees or approximately 270 degrees from the first angle A; and (d) generating a fourth set L4 of parallel lines to be printed at the second frequency F2 and the second angle B using a fourth color C4, wherein the lines of the fourth set L4 have a width that is the minimum width that can be printed by the print engine. The method also comprises, by the print engine, printing the pattern mark in the boundary on the substrate.

Clause 2: The method of clause 1, wherein: (a) generating the first set L1 of lines and the second set L2 of lines comprises positioning each line of the first set L1 to have one side that is adjacent to or partially overlapping with a corresponding line of the second set L2, and positioning each line of the second set L2 to have one side that is that adjacent to or partially overlapping with a corresponding line of the first set L1; and (b) generating the third set L3 of lines and the fourth set L4 of lines comprises positioning each line of the third set L3 to have one side that is adjacent to or partially overlapping with a corresponding line of the fourth set L4, and positioning each line of the fourth set L4 to have one side that is that adjacent to or partially overlapping with a corresponding line of the third set L3.

Clause 3: The method of clause 1 or 2, wherein all of the colors C1, C2, C3, and C4 are different from each other.

Clause 4: The method of clause 1 or 2, wherein two of the colors C1, C2, C3, and C4 are the same as each other, and the other two of the colors are different from each other.

Clause 5: The method of any of clauses 1-4, wherein the lines of the first set L1 and the lines of the third set L3 all have a width that is greater than the minimum width.

Clause 6: The method of any of clauses 1-5, wherein all lines of the first set L1 and second set L2 are solid lines that intersect with a plurality of lines of the third set L3 and the fourth set L4.

Clause 7: The method of any of clauses 1-5, wherein at least some of the lines of the first set L1 and second set L2 are broken lines to provide gaps in which lines of the first and second sets and lines of the third and fourth sets do not intersect.

Clause 8: The method of clause 7, wherein the lines of the second set L2 are also broken.

Clause 9: The method of any of clauses 1-8 further comprising, by an electronic device, using a camera of the electronic device to capture a video of the pattern mark, and displaying the pattern mark on a display of the electronic device, wherein the pattern exhibits an enhanced moiré effect when displayed.

Clause 10: The method of any of clauses 1-9 further comprising printing a correlation mark on the substrate, wherein at least a portion of the correlation mark is printed in the boundary with the pattern mark.

Clause 11. A substrate on which a pattern mark is printed, the pattern mark comprising: (a) a first set L1 of parallel lines printed in a bounded area at a first frequency F1 and first angle A, wherein the lines of the first set L1 exhibit a first color C1; (b) a second set L2 of parallel lines printed in the bounded area at the first frequency F1 and first angle A, wherein the lines of the second set L2 exhibit a second color C2 and have a width of one pixel; (c) a third set L3 of parallel lines printed in the bounded area at a second frequency F2 and a second angle B, wherein the lines of the third set L3 exhibit a third color C3, and wherein the second angle B is plus or minus approximately 90 degrees or approximately 270 degrees from the first angle A; and (d) a fourth set L4 of parallel lines printed in the bounded area at the second frequency F2 and the second angle B, wherein the lines of the fourth set L4 exhibit a fourth color C4, and wherein the lines of the fourth set L4 have a width of one pixel. The pattern mark causes the substrate to exhibit an enhanced moiré effect.

Clause 12: The substrate of clause 11, wherein: (a) each line of the first set L1 has one side that is adjacent to or partially overlapping with a corresponding line of the second set L2; (b) each line of the second set L2 has one side that is that adjacent to or partially overlapping with a corresponding line of the first set L1; (c) each line of the third set L3 has one side that is adjacent to or partially overlapping with a corresponding line of the fourth set L4; and (d) each line of the fourth set L4 has one side that is that adjacent to or partially overlapping with a corresponding line of the third set L3.

Clause 13: The substrate of clause 11 or 12, wherein all of the colors C1, C2, C3, and C4 are different from each other.

Clause 14: The substrate of clause 11 or 12, wherein two of the colors C1, C2, C3, and C4 are the same as each other, and the other two of the colors are different from each other.

Clause 15: The substrate of any of clauses 11-14, wherein the lines of the first set L1 and the lines of the third set L3 all have a width that is greater than the minimum width.

Clause 16: The substrate of any of clauses 11-15, wherein all lines of the first set L1 and second set L2 are solid lines that intersect with a plurality of lines of the third set L3 and the fourth set L4.

Clause 17: The substrate of any of clauses 11-15, wherein at least some of the lines of the first set L1 and second set L2 are broken lines to provide gaps in which lines of the first and second sets and lines of the third and fourth sets do not intersect.

Clause 18: The substrate of clause 17, wherein the lines of the second set L2 are also broken.

Clause 19: The substrate of any of clauses 11-18, further comprising a correlation mark, wherein at least a portion of the correlation mark is printed in the bounded area with the pattern mark.

Clause 20: A system comprising: (a) a substrate on which a pattern mark is printed substrate and pattern mark comprising that of any of clauses 11-19; and (b) an electronic device comprising a camera and a display, wherein the pattern mark will exhibit an enhanced moiré effect when captured by the camera and output on the display.

Clause 21: A method of printing a mark on a substrate, the method comprising, by a processor: (a) rendering a first pattern ink comprising a first pattern that, when printed on a substrate in a print area, will exhibit a first set of fluorescent properties; (b) rendering a second pattern ink comprising a second pattern that, when printed on a substrate in the print area, will exhibit a second set of fluorescent properties;

and (c) creating a mark that includes a background portion made of the first pattern ink and a foreground portion made of the second pattern ink. The method also comprises, by a print engine of a print device, printing the mark within the print area on the substrate. The foreground portion represents a message that is hidden when viewed under ambient light but visible when viewed under ultraviolet light.

Clause 22: The method of clause 21, wherein the first pattern ink and the second pattern ink appear to a single color when viewed in ambient light.

Clause 23: The method of clause 21 or 22, wherein one of the two pattern inks blocks UV light-triggered fluorescence of the substrate by a first amount, the other of the two pattern inks blocks UV light-triggered fluorescence of the substrate by a second amount that is less than the first amount.

Clause 24: The method of any of clauses 21-23, wherein one of the two pattern inks substantially blocks UV light-triggered fluorescence of the substrate, and the other of the two pattern inks substantially passes UV light-triggered fluorescence of the substrate.

Clause 25: The method of any of clauses 21-24, wherein rendering the first pattern ink and printing the portion of the mark that comprises the first pattern ink on the substrate is done according to the method of any of clauses 1-10.

Clause 26: The method of any of clauses 21-24, wherein rendering the first pattern ink and printing the portion of the mark that comprises the first pattern ink on the substrate is done according to the method of any of clauses 41-46.

Clause 27: The method of any of clauses 21-24, wherein rendering the first pattern ink and printing the portion of the mark that comprises the first pattern ink on the substrate is done according to the method of any of clauses 61-68.

Clause 28: The method of any of clauses 21-27, wherein the pattern mark also will exhibit an enhanced moiré effect.

Clause 29: A substrate on which a pattern mark is printed, the pattern mark comprising a print area comprising: (a) a foreground portion comprising a first pattern ink of a first pattern that exhibits a first set of fluorescent properties, and (b) a background portion comprising a second pattern ink of a second pattern that exhibits a second set of fluorescent properties herein. The first pattern ink and the second pattern ink will appear to be a single color when viewed in ambient light. One of the pattern inks substantially blocks UV light-triggered fluorescence of the substrate, and the other of the pattern inks substantially passes UV light-triggered fluorescence of the substrate. The foreground portion comprises a message that will be hidden when viewed under ambient light but visible when viewed under ultraviolet light.

Clause 30: The substrate of clause 29, wherein the pattern mark will cause the substrate to exhibit an enhanced moiré effect when viewed under ambient light.

Clause 31: A method of printing a mark on a substrate, the method comprising, by a processor, generating a pattern mark to be printed within a boundary on a substrate by: (a) generating a checkered pattern comprising a first set of cells to be printed with color C1 and a second set of cells to be printed with color C2; (b) generating a first set L1 of broken parallel lines of color C3 to be printed along edges of the first set of cells and/or the second set of cells; (c) generating a set of frame elements of color C4, wherein each frame element will be positioned to frame one of the two sets of cells; and (d) rendering a pattern mark that includes the checkered pattern, the broken parallel lines, and the frame elements. The method also comprises, by the print engine, printing the pattern mark in the boundary on the substrate.

Clause 32: The method of clause 31, further comprising generating a second set L2 of broken parallel lines of color C4 to be printed along edges of the first set of cells and/or the second set of cells, wherein the lines of the first set L1 and the lines of the second set L2 are perpendicular to each other. This method also comprises, when rendering the pattern mark, also including the second set L2 of broken parallel lines in the pattern mark.

Clause 33: The method of clause 31 or 32, wherein generating the set of frame elements of color C4 comprises positioning at least some of the frame elements in corners of the one of the two sets of cells.

Clause 34: The method of any of clauses 31-33, wherein one of the colors C1 or C2 is white, and the other of the colors C1 or C2 is not white.

Clause 35: The method of any of clauses 31-24, further comprising positioning the first set L1 of broken parallel lines in gutters that exist between cells of the first set or the second set.

Clause 36: The method of clause 31 further comprising, by an electronic device, using a camera of the electronic device to capture a video of the pattern mark. and displaying the pattern mark on a display of the electronic device, wherein the pattern exhibits an enhanced moiré effect when displayed.

Clause 37: A substrate comprising a pattern mark, the pattern mark comprising: (a) a checkered pattern comprising a first set of cells of color C1 and a second set of cells of color C2; (b) a first set L1 of broken parallel lines of color C3 positioned along edges of the first set of cells and/or the second set of cells; and (c) a set of frame elements of color C4, wherein each frame element is positioned to frame one of the two sets of cells. The pattern mark causes the substrate to exhibit an enhanced moiré effect.

Clause 38: The substrate of clause 37, wherein the pattern mark further comprises a second set L2 of broken parallel lines of color C4 positioned along edges of the first set of cells and/or the second set of cells, wherein the lines of the first set L1 and the lines of the second set L2 are perpendicular to each other.

Clause 39: The substrate of clause 37 or 38, wherein at least some of the frame elements of color C4 are positioned in corners of the one of the two sets of cells.

Clause 40: The substrate of any of clauses 37-39, wherein the first set L1 of broken parallel lines are positioned in in gutters between cells of the first set or the second set.

Clause 41: A method of printing a mark on a substrate, the method comprising, by a processor, rendering a pattern mark by: (a) generating a first set L1 of parallel lines to be printed at a frequency F using a first ink, wherein the lines of the first set L1 have a width that is a minimum width that can be printed by a print engine; (b) generating a second set L2 of parallel lines to be printed at the frequency F using a second ink, wherein the lines of the second set L2 also have a width that is the minimum width that can be printed by the print engine; (c) generating a third set L3 of parallel lines to be printed at the frequency F using a third ink, wherein the lines of the third set L3 have a width that is at least two times the minimum width; (d) rendering a first pattern of parallel bars to be printed at the frequency F, wherein each of the parallel bars in the first pattern comprises a line of the third set L3 positioned between a line of the first set L1 and a line of the second set L2; and (e) rendering a second pattern of parallel bars to be printed at the frequency F and at an orientation that is substantially perpendicular to the parallel bars of the first pattern, wherein each of the parallel bars of the second pattern also comprises a line of the third set L3 positioned between a line of the first set L1 and a line of the second set L2. The method also comprises, by a print engine, printing the pattern mark within a print area on a substrate by printing the first pattern in a background section of the print area, and printing the second pattern in a foreground section of the print area.

Clause 42: The method of clause 41, wherein rendering each of the first pattern of parallel bars and the second pattern of parallel bars comprises, for each of the parallel bars in each pattern: (a) positioning each line of the first set L1 to have one side that is adjacent to or partially overlapping with a corresponding line of the third set L3; and (b) positioning each line of the second set L2 to have one side that is that adjacent to or partially overlapping with a corresponding line of the third set L3.

Clause 44: The method of clause 41 or 42, wherein each of the first ink, the second ink, and the third ink are of different colors.

Clause 44: The method of any of clauses 41-43. wherein the foreground section comprises alphanumeric characters.

Clause 45: The method of any of clauses 41-44 further comprising, by an electronic device, using a camera of the electronic device to capture a video of the pattern mark, and displaying the pattern mark on a display of the electronic device, wherein the pattern exhibits an enhanced moiré effect when displayed.

Clause 46: The method of any of clauses 41-45, wherein: (a) the first pattern, when printed on the substrate in the print area, will exhibit a first set of fluorescent properties; and (b) the second pattern, when printed on the substrate in the print area, will exhibit a second set of fluorescent properties.

Clause 47: The method of clause 46, wherein the foreground portion represents a message that is hidden when viewed under ambient light but visible when viewed under ultraviolet light.

Clause 48: A substrate on which a pattern mark is printed, the pattern mark comprising: (a) a background area comprising a first pattern of parallel bars printed at a frequency F; and (b) a foreground area comprising a second pattern of parallel bars printed at the frequency F, wherein each of the parallel bars of the second pattern is printed at an orientation that is substantially perpendicular to the parallel bars of the first pattern. Each of the parallel bars of each of the first and second pattern comprises: (a) a first line that has a first color C1 and a width of a single pixel; (b) a second line that has a second color C2 and a width of a single pixel; and (c) a third line that is positioned between the first line and the second line, has a third color C3, and a width of at least two pixels. The pattern mark causes the substrate to exhibit an enhanced moiré effect.

Clause 49: The substrate of clause 48, wherein, for each of the parallel bars in each pattern: (a) each line of the first set L1 is positioned to have one side that is adjacent to or partially overlapping with a corresponding line of the third set L3 in that pattern; and (b) each line of the second set L2 is positioned to have one side that is that adjacent to or partially overlapping with a corresponding line of the third set L3 in that pattern.

Clause 50: The substrate clauses 48 or 49, wherein each of the first color C1, the second color C2, and the third color C3 are different colors.

Clause 51: The substrate of any of clauses 48-50, wherein the foreground section comprises alphanumeric characters.

Clause 52: A system comprising a substrate on which a pattern mark is printed, the pattern mark comprising that of any of clauses 48-51, and an electronic device comprising a camera and a display, wherein the pattern mark will exhibit an enhanced moiré effect when captured by the camera and output on the display.

Clause 61: A method of printing a monochromatic pattern mark on a substrate, the method comprising, by a processor, generating a pattern mark to be printed within a boundary on a substrate by rendering a first set L1 of pattern ink segments each of which comprises: (a) a solid center line that is black and has a color value of approximately 100% K; (b) a first outer line that is dashed, grey, and adjacent to a first side of the center line; and (c) a second outer line that is dashed, grey, and adjacent to a second side of the center line, wherein each of the first and second outer lines has a color value of less than approximately 100% K. The method also includes, by a print engine of a print device, printing the first set L1 of pattern ink segments on the substrate in the boundary at a first frequency F1 and a first angle A.

Clause 62: The method of clause 61, wherein the first outer line and the second outer line of each pattern ink segment of the first set L1 have a width that is a minimum width that can be printed by the print engine.

Clause 63: The method of clause 62, wherein the center line of each pattern ink segment of the first set L1 has a width that is greater than that of the first outer line and second outer line of that pattern ink segment.

Clause 64: The method of any of clauses 61-63, wherein the first outer line and the second outer line of each pattern ink segment exhibit different dash patterns.

Clause 65: The method of any of clauses 61-64, further comprising generating a mask corresponding to text that is to appear in the monochromatic pattern mark, wherein printing the first set L1 of pattern ink segments comprises only doing so outside of the mask. The method further comprises printing a second set L2 of pattern ink segments within the mask.

Clause 66: The method of any of clauses 61-65, further comprising rendering the pattern ink of second set L2 segments to each comprise: (a) a solid center line that is black and has a color value of approximately 100% K; (b) a first outer line that is dashed, grey, has a color value of less than approximately 100% K, and is and adjacent to a first side of the center line of that L2 pattern ink segment; and (c) a second outer line that is dashed, grey, has a color value of less than approximately 100% K, and is adjacent to a second side of the center line of that L2 pattern ink segment. The method also comprises printing the second set L2 of pattern ink segments in the mask at a second frequency F2 and a second angle B, where the second angle B is approximately 90 degrees or approximately 270 degrees away from the first angle A.

Clause 67: The method of any of clauses 61-66, further comprising generating a mask corresponding to text that is to appear in the monochromatic pattern mark. In addition, in this embodiment generating and printing the first set L1 of pattern ink segments comprises only doing so inside of the mask, and the method further comprises generating and printing a second set L2 of pattern ink segments outside of the mask.

Clause 68: The method of any of clauses 61-67 further comprising, by an electronic device: (a) using a camera of the electronic device to capture a video of the pattern mark; and (b) displaying the pattern mark on a display of the electronic device, wherein the pattern mark exhibits an enhanced moiré effect when displayed.

Clause 69: A substrate on which a monochromatic pattern mark is printed, the pattern mark comprising a first set L1 of pattern ink segments printed on the substrate at a first frequency F1 and a first angle A, wherein each of the pattern ink segments comprises: (a) a solid center line that is black and has a color value of approximately 100% K; (b) a first outer line that is dashed, grey, and adjacent to a first side of the center line; and (c) a second outer line that is dashed, grey, and adjacent to a second side of the center line. Each of the first and second outer lines has a color value of less than approximately 100% K. The pattern mark causes the substrate to exhibit an enhanced moiré effect.

Clause 70: The substrate of clause 69, wherein the first set L1 of pattern ink segments are only printed outside of a text box, and the pattern mark further comprises a second set L2 of pattern ink segments printed on the substrate within the text box at a second frequency F2 and a second angle B, wherein: (a) the second angle B is approximately 90 degrees or approximately 270 degrees away from the first angle A, and (b) each of the pattern ink segments in the second set L2 also comprises: (i) a solid center line that is black and has a color value of approximately 100% K; (ii) a first outer line that is dashed, grey, has a color value of less than approximately 100% K, and is and adjacent to a first side of the center line of that L2 pattern ink segment; and (iii) a second outer line that is dashed, grey, has a color value of less than approximately 100% K, and is adjacent to a second side of the center line of that L2 pattern ink segment.

Clause 71: The substrate of clause 69 or 70, wherein the first outer line and the second outer line of each pattern ink segment of the first set L1 have a width of one pixel.

Clause 72: The substrate of clause 71, wherein the center line of each pattern ink segment of the first set L1 has a width that is greater than that of the first outer line and second outer line of that pattern ink segment.

Clause 73: The substrate of any of clauses 70-72, wherein the first outer line and the second outer line of each pattern ink segment of the second set L2 have a width of one pixel.

Clause 74: The substrate of clause 73, wherein the center line of each pattern ink segment of the second set L2 has a width that is greater than that of the first outer line and second outer line of that pattern ink segment.

Clause 75: The substrate of any clauses 69-74, wherein the first outer line and the second outer line of each pattern ink segment exhibit different dash patterns.

Clause 76: A system comprising: (a) a substrate on which a pattern mark is printed, the substrate and pattern mark comprising that of any of clauses 69-74; and (b) an electronic device comprising a camera and a display, wherein the pattern mark will exhibit an enhanced moiré effect when captured by the camera and output on the display.

Clause 77. A method of printing a pattern mark on a substrate, the method comprising, by a processor: (a) rendering a first pattern mark comprising a correlation mark that comprises a first set of lines having a first width, a first color, a frequency F, and a first orientation angle A with respect to a border of a print area; (b) rendering a second pattern mark comprising a second set of lines having the frequency F and a second orientation angle B with respect to the border of the print area; and (c) expanding the lines of the first set to a second width, by adding a pixel or fraction of a pixel of a second color to at least one side of each of the lines of the first set. The method also includes, by a print engine of a print device, printing the first pattern mark and the second pattern mark within the print area on the substrate so that at least a portion of the second pattern mark is printed in the same space as the first pattern mark.

Clause 78: The method of clause 77, wherein each of the lines of the second set also has the first width and the first color, and the method also comprises expanding the lines of the second set to the second width by adding a pixel or a fraction of a pixel of the second color to at least one side of each of the lines of the second set.

Clause 79: The method of clause 77 or 78, wherein rendering the correlation mark comprises: (a) creating a first pattern element comprising a first set of lines that will be printed at an angle A and a frequency F; (b) creating a second pattern element comprising a second set of lines that will be printed at the angle A and the frequency F; (c) rendering the first pattern element as a background of the second pattern mark; and (d) rendering the second pattern element as a foreground of the second pattern mark.

Clause 80: The method of any of clauses 77-79, wherein rendering the first pattern mark and printing the first pattern mark on the substrate is done according to the method of any of clauses 1-10.

Clause 81: The method of any of clauses 77-79, wherein rendering the first pattern mark and printing the first pattern mark on the substrate is done according to the method of any of clauses 21-28.

Clause 82. The method of any of clauses 77-79, wherein rendering the first pattern mark and printing the first pattern mark on the substrate is done according to the method of any of clauses 61-68.

The invention claimed is:

1. A method of printing a mark on a substrate, the method comprising:

by a processor, generating a pattern mark to be printed by a print engine within a boundary on a substrate by:

generating a first set L1 of parallel lines to be printed at a first frequency F1 and a first angle A using a first color C1, generating a second set L2 of parallel lines to be printed at the first frequency F1 and the first angle A using a second color C2, wherein the lines of the second set L2 have a width that is a minimum width that can be printed by the print engine, generating a third set L3 of parallel lines to be printed at a second frequency F2 and a second angle B using a third color C3, wherein the second angle B is plus or minus approximately 90 degrees or approximately 270 degrees from the first angle A, and generating a fourth set L4 of parallel lines to be printed at the second frequency F2 and the second angle B using a fourth color C4, wherein the lines of the fourth set L4 have a width that is the minimum width that can be printed by the print engine, wherein the lines of the first set L1 and the lines of the third set L3 all have a width that is greater than the minimum width; and by the print engine, printing the pattern mark in the boundary on the substrate.

2. The method of claim 1, wherein:

generating the first set L1 of lines and the second set L2 of lines comprises:

positioning each line of the first set L1 to have one side that is adjacent to or partially overlapping with a corresponding line of the second set L2, and positioning each line of the second set L2 to have one side that is that adjacent to or partially overlapping with a corresponding line of the first set L1; and generating the third set L3 of lines and the fourth set L4 of lines comprises:

positioning each line of the third set L3 to have one side that is adjacent to or partially overlapping with a corresponding line of the fourth set L4, and positioning each line of the fourth set L4 to have one side that is that adjacent to or partially overlapping with a corresponding line of the third set L3.

3. The method of claim 1, wherein all of the colors C1, C2, C3, and C4 are different from each other.

4. The method of claim 1, wherein two of the colors C1, C2, C3, and C4 are the same as each other, and the other two of the colors are different from each other.

5. The method of claim 1, wherein all lines of the first set L1 and second set L2 are solid lines that intersect with a plurality of lines of the third set L3 and the fourth set L4.

6. The method of claim 1, wherein at least some of the lines of the first set L1 and second set L2 are broken lines to provide gaps in which lines of the first and second sets and lines of the third and fourth sets do not intersect.

7. The method of claim 6, wherein the lines of the second set L2 are also broken.

8. The method of claim 1 further comprising, by an electronic device:

using a camera of the electronic device to capture a video of the pattern mark; and displaying the video of the pattern mark on a display of the electronic device, wherein the pattern mark in the video exhibits an enhanced moiré effect when displayed.

9. A substrate on which a pattern mark is printed, the pattern mark comprising:

a first set L1 of parallel lines printed in a bounded area at a first frequency F1 and a first angle A, wherein the lines of the first set L1 exhibit a first color C1;

a second set L2 of parallel lines printed in the bounded area at the first frequency F1 and the first angle A, wherein the lines of the second set L2 exhibit a second color C2 and have a width of one pixel;

a third set L3 of parallel lines printed in the bounded area at a second frequency F2 and a second angle B, wherein the lines of the third set L3 exhibit a third color C3, and wherein the second angle B is plus or minus approximately 90 degrees or approximately 270 degrees from the first angle A; and a fourth set L4 of parallel lines printed in the bounded area at the second frequency F2 and the second angle B, wherein the lines of the fourth set L4 exhibit a fourth color C4, and wherein the lines of the fourth set L4 have a width of one pixel.

10. The substrate of claim 9, wherein:

each line of the first set L1 has one side that is adjacent to or partially overlapping with a corresponding line of the second set L2;

each line of the second set L2 has one side that is that adjacent to or partially overlapping with a corresponding line of the first set L1;

each line of the third set L3 has one side that is adjacent to or partially overlapping with a corresponding line of the fourth set L4; and each line of the fourth set L4 has one side that is that adjacent to or partially overlapping with a corresponding line of the third set L3.

11. The substrate of claim 9, wherein all of the colors C1, C2, C3, and C4 are different from each other.

12. The substrate of claim 9, wherein two of the colors C1, C2, C3, and C4 are the same as each other, and the other two of the colors are different from each other.

13. The substrate of claim 9, wherein all lines of the first set L1 and second set L2 are solid lines that intersect with a plurality of lines of the third set L3 and the fourth set L4.

14. The substrate of claim 9, wherein at least some of the lines of the first set L1 and second set L2 are broken lines to provide gaps in which lines of the first and second sets and lines of the third and fourth sets do not intersect.

15. The substrate of claim 14, wherein the lines of the second set L2 are also broken.

16. A method of printing a mark on a substrate, the method comprising:

by a processor, generating a pattern mark to be printed by a print engine within a boundary on a substrate by:

generating a first set L1 of parallel lines to be printed at a first frequency F1 and a first angle A using a first color C1, generating a second set L2 of parallel lines to be printed at the first frequency F1 and the first angle A using a second color C2, wherein the lines of the second set L2 have a width that is a minimum width that can be printed by the print engine, generating a third set L3 of parallel lines to be printed at a second frequency F2 and a second angle B using a third color C3, wherein the second angle B is plus or minus approximately 90 degrees or approximately 270 degrees from the first angle A, and generating a fourth set L4 of parallel lines to be printed at the second frequency F2 and the second angle B using a fourth color C4, wherein the lines of the fourth set L4 have a width that is the minimum width that can be printed by the print engine, wherein at least some of the lines of the first set L1 and second set L2 are broken lines to provide gaps in which lines of the first and second sets and lines of the third and fourth sets do not intersect; and by the print engine, printing the pattern mark in the boundary on the substrate.

17. The method of claim 16, wherein:

generating the first set L1 of lines and the second set L2 of lines comprises:

positioning each line of the first set L1 to have one side that is adjacent to or partially overlapping with a corresponding line of the second set L2, and positioning each line of the second set L2 to have one side that is that adjacent to or partially overlapping with a corresponding line of the first set L1; and generating the third set L3 of lines and the fourth set L4 of lines comprises:

positioning each line of the third set L3 to have one side that is adjacent to or partially overlapping with a corresponding line of the fourth set L4, and positioning each line of the fourth set L4 to have one side that is that adjacent to or partially overlapping with a corresponding line of the third set L3.

18. The substrate of claim 17, wherein:

each line of the first set L1 has one side that is adjacent to or partially overlapping with a corresponding line of the second set L2;

each line of the second set L2 has one side that is that adjacent to or partially overlapping with a corresponding line of the first set L1;

each line of the third set L3 has one side that is adjacent to or partially overlapping with a corresponding line of the fourth set L4; and each line of the fourth set L4 has one side that is that adjacent to or partially overlapping with a corresponding line of the third set L3.

19. The method of claim 16, wherein all of the colors C1, C2, C3, and C4 are different from each other.

20. The method of claim 16, wherein two of the colors C1, C2, C3, and C4 are the same as each other, and the other two of the colors are different from each other.

21. The method of claim 16, wherein the lines of the second set L2 are also broken.

22. The method of claim 16 further comprising, by an electronic device:

using a camera of the electronic device to capture a video of the pattern mark; and displaying the video of the pattern mark on a display of the electronic device, wherein the pattern mark in the video exhibits an enhanced moiré effect when displayed.

23. A substrate on which a pattern mark is printed, the pattern mark comprising:

a first set L1 of parallel lines printed in a bounded area at a first frequency F1 and a first angle A, wherein the lines of the first set L1 exhibit a first color C1;

a second set L2 of parallel lines printed in the bounded area at the first frequency F1 and the first angle A, wherein the lines of the second set L2 exhibit a second color C2 and have a width of one pixel;

a third set L3 of parallel lines printed in the bounded area at a second frequency F2 and a second angle B, wherein the lines of the third set L3 exhibit a third color C3, and wherein the second angle B is plus or minus approximately 90 degrees or approximately 270 degrees from the first angle A; and a fourth set L4 of parallel lines printed in the bounded area at the second frequency F2 and the second angle B, wherein the lines of the fourth set L4 exhibit a fourth color C4, and wherein the lines of the fourth set L4 have a width of one pixel, wherein at least some of the lines of the first set L1 and second set L2 are broken lines to provide gaps in which lines of the first and second sets and lines of the third and fourth sets do not intersect.

24. The substrate of claim 23, wherein all of the colors C1, C2, C3, and C4 are different from each other.

25. The substrate of claim 23, wherein two of the colors C1, C2, C3, and C4 are the same as each other, and the other two of the colors are different from each other.

26. The substrate of claim 23, wherein the lines of the second set L2 are also broken.

* * * * *